US006513679B2

(12) United States Patent
Greenwald et al.

(10) Patent No.: US 6,513,679 B2
(45) Date of Patent: Feb. 4, 2003

(54) DRUG STORAGE AND DISPENSING APPARATUS

(76) Inventors: Shlomo Greenwald, 113 Randolph Rd., Ithaca, NY (US) 14850; Zipora Greenwald, 113 Randolph Rd., Ithaca, NY (US) 14850

( * ) Notice: Subject to any disclaimer, the term of this patent is extended or adjusted under 35 U.S.C. 154(b) by 0 days.

(21) Appl. No.: 09/887,637

(22) Filed: Jun. 22, 2001

(65) Prior Publication Data

US 2002/0195459 A1 Dec. 26, 2002

(51) Int. Cl.[7] ................................................ B65G 59/00

(52) U.S. Cl. .................. 221/287; 221/298; 221/312 R; 221/296

(58) Field of Search ................................ 221/296, 298, 221/287, 289, 241, 197, 2, 3, 312 R

(56) References Cited

U.S. PATENT DOCUMENTS

| | | | | | |
|---|---|---|---|---|---|
| 2,781,947 | A | * | 2/1957 | Webster et al. | 221/298 |
| 2,916,125 | A | * | 12/1959 | Wallberg | 221/298 |
| 3,105,610 | A | * | 10/1963 | Aidlin et al. | 221/298 |
| 3,215,241 | A | * | 11/1965 | Haefele et al. | 221/298 |
| 3,294,284 | A | * | 12/1966 | Chambers | 221/298 |
| 3,410,452 | A | * | 11/1968 | Igel et al. | 221/197 |
| 3,446,397 | A | * | 5/1969 | Chambers | 221/296 |
| 3,775,941 | A | * | 12/1973 | Bross | 221/296 |
| 4,058,223 | A | * | 11/1977 | Cruse | 221/298 |
| 5,337,919 | A | | 8/1994 | Spaulding et al. | 221/2 |
| 5,845,810 | A | * | 12/1998 | Laznicka | 221/289 |
| 6,085,938 | A | | 7/2000 | Coughlin | 221/203 |

* cited by examiner

*Primary Examiner*—H. Grant Skaggs
(74) *Attorney, Agent, or Firm*—Brown & Michaels, PC

(57) ABSTRACT

A device to automatically dispense solid medicinal units, such as pills, capsules, or the like, based upon patient needs. The medicinal units are stored in long, thin tubes. Each tube stores, in single-line, vertical fashion, a series of units of the same drug. The medicinal units, thusly stored, are efficiently dispensed from the bottom portion of the tube through a novel valve. In some embodiments, the valve is a permanent part of the tube; in others, the valve separates and re-connects to the tube to facilitate refilling of empty tubes at a drug refilling center. In still another embodiment, the valve comprises a thin wall molted elastic rubber tube sleeve mounted on the lower part of the plastic tube containing the medicinal units. In such embodiment, small holes or slits in the lower portion of the plastic tube accommodate the portions of the elastic tube sleeve that act as shutter and catcher doors controlling the dispensing of the medicinal units; the outer tube sleeve is manipulated by a valve control mechanism during drug extraction.

13 Claims, 19 Drawing Sheets

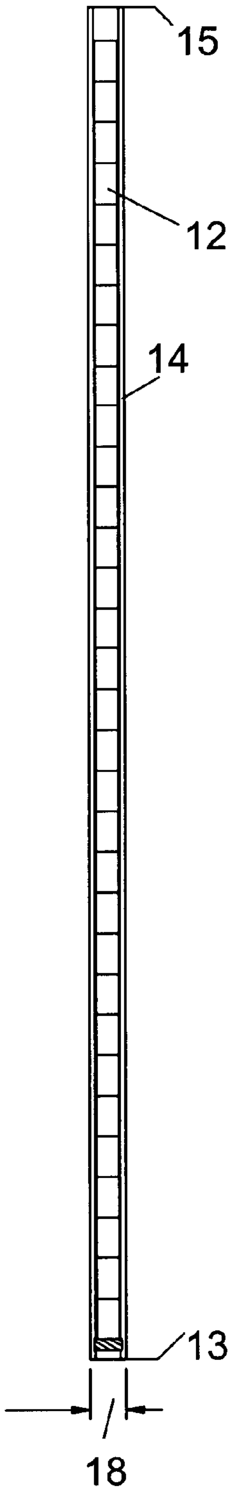
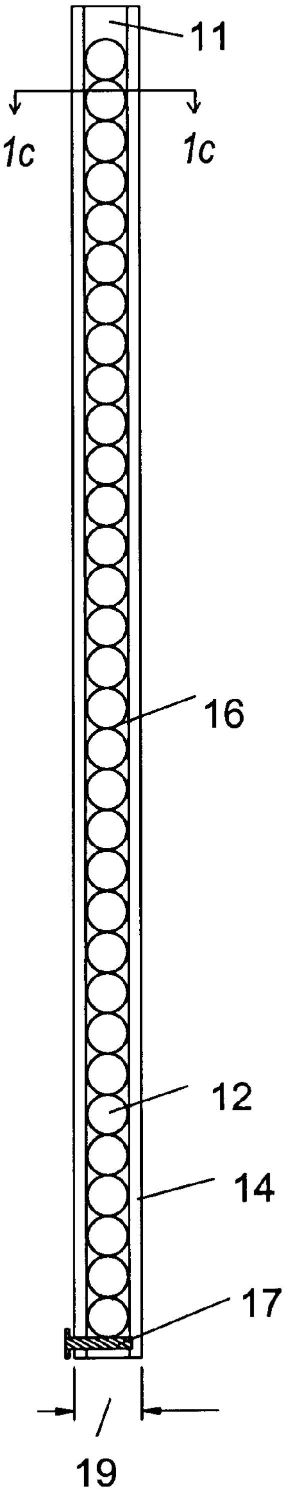
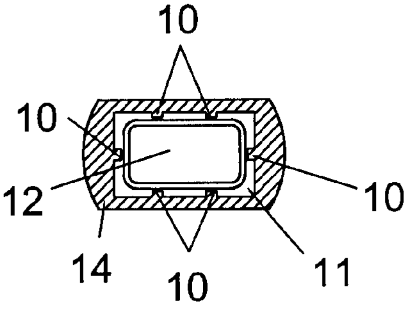
Fig. 1c
Fig. 1a Fig. 1b

Fig. 13a
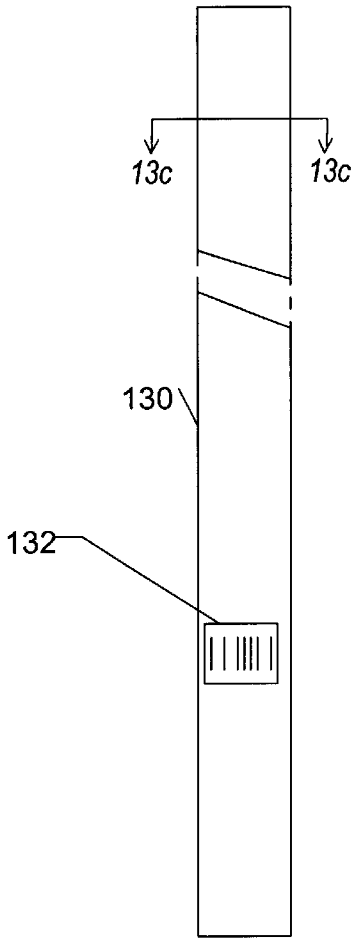
Fig. 13b
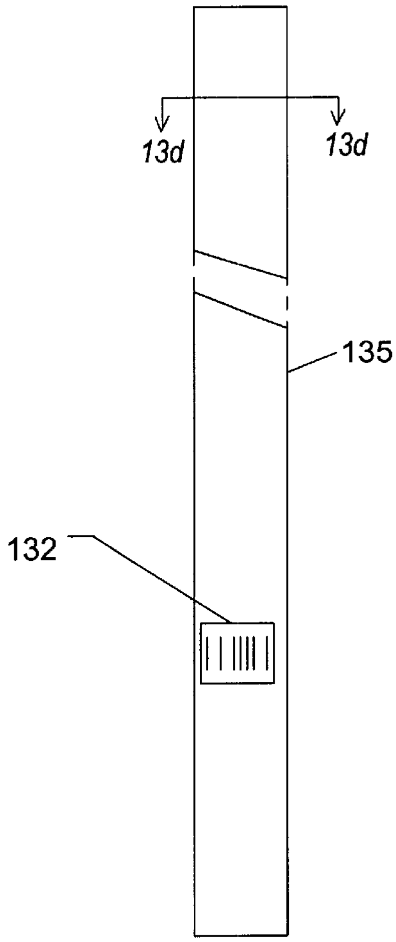
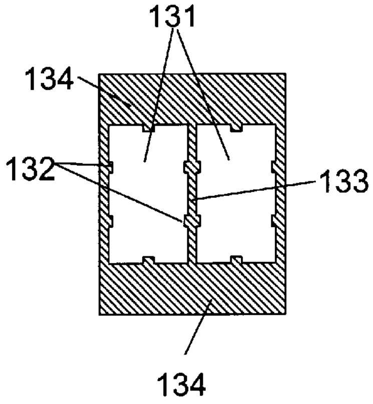
Fig. 13c
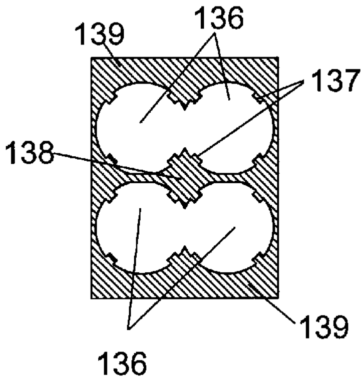
Fig. 13d

DRUG STORAGE AND DISPENSING APPARATUS

BACKGROUND OF THE INVENTION

1. Field of the Invention

The invention pertains to the field of medication storage and dispensing devices. More particularly, the invention pertains to a device for automatically dispensing solid medicinal units, such as pills and capsules, based upon patient needs.

2. Description of Related Art

Most medications are consumed orally. Most are distributed in two forms, pills and capsules. Since pills and capsules must be swallowed, they cannot be too small or too large. They are made in approximately 25 to 30 different sizes. Pills are shaped like a thin disk, while capsules are shaped like a cylinder with semi-spherical ends. There are at least 2,000 different drugs that must be dispensed to patients in hospitals or pharmacies, and more are developed every year. Accordingly, there is a need to automate dispensing of such drugs in a manner that is free of human error, fast, efficient, and able to handle most if not all of the different drugs that patients need.

Automated prescription filling solutions exist in the art. The most advanced of these incorporate robotic techniques to dispense tablets or capsules into vials. Still, medication-dispensing technology has, in some instances, had to sacrifice some level of compactness to achieve accurate and efficient dispensing of drugs while storing ample reserves of the same for future dispensing. For example, the medicament-dispensing cell disclosed in U.S. Pat. No. 6,085,938 includes a medicament storage section, a rotatable platen, and a dispensing assembly for conveying medicament in single file from the storage section to the discharge section. The width of the storage section is significantly greater than the width of the medicaments, however, such that typically the system built upon the device, such as the SCRIPTPRO SP 200 system, contains only approximately 200 medication dispensing cells. Additionally, in the storage section the pills or capsules are grouped together such that, during storage and handling, and when a pill is extracted, the other pills move and rub against each other. Such rubbing can cause flaking or erosion at the side of the medicament, and dust from one medication could stick to another absent thorough cleaning of the cell and mechanism.

The automatic medicament dispensing system disclosed in U.S. Pat. No. 5,337,919 includes a number of medication-dispensing cells, as well as memory associated with the controller for storing cell data, including the location of, and medicament assigned to, each cell. In operation, the system controller receives instructions for a prescription including the medication and quantity to be dispensed. The controller then moves a manipulator arm to the appropriate cell as indicated by the cell data, and transfers the medication from the cell into a vial. A problem can develop, however, if the cell data is incorrect or the locations of the various cells have been changed. Such might occur, for example, if an attendant removes more than one cell for replenishment and does not replace the cells to the same locations. In such a situation, the controller would move the manipulator arm to the cell location corresponding to the cell data for the prescribed medicament. The cell at that location would not contain the medicament as indicated by the cell data and, as a result, the wrong medicament would be dispensed.

Due to the above-described and other limitations, it is desirable to provide a medicament-dispensing system that compactly stores thousands of different drugs, dispenses the drugs accurately and efficiently, minimizes the possibility of human error that would result in the wrong medication or quantity being dispensed, and stores the drugs such that they cannot move and rub against each other, and hence, are unlikely to chip, flake, powder or stick together.

SUMMARY OF THE INVENTION

This application discloses and claims an invention that is useful in conjunction with a system of the type shown and described in a commonly owned U.S. application entitled, "HOSPITAL DRUG DISTRIBUTION SYSTEM," filed on the same day as the present application. That application is hereby incorporated by reference herein in its entirety.

The invention comprises a device to dispense solid medicinal units, such as pills, capsules, or the like (hereinafter, "medicinal units," or simply, "units"), automatically, based upon patient needs. In the invented device, the medicinal units are stored in long, thin tubes. Each tube stores, in single-line, vertical fashion, a series of units of the same drug. The tube is specially designed for efficient dispensing of the appropriate number of medicinal units from the bottom portion thereof Such is accomplished through use of a novel valve at the bottom of the tube.

When drug tubes become empty, they are either discarded and replaced by a full drug tube, or returned to a drug refilling center to be refilled, depending upon the embodiment. The drug refilling centers are regional operations that stock large quantities of drugs, receive orders for tubes filled with specific drugs, and deliver filled drug tubes to hospitals, pharmacies, nursing homes, or any other institution that maintains a drug distribution system utilizing the invented device. Having such regional centers refill the tubes is advantageous in that it is cost effective and efficient for drug tube refilling to be done on a large scale, preferably with automation and safeguard instrumentalities. Such automation and safeguards minimize errors, so that each drug tube is always filled with the drug as indicated by an identification means, such as a barcode label or a memory chip, affixed to the tube. Also, the use of refilling centers eliminates the expense for each pharmacy, hospital or nursing home to maintain such a refilling operation for its own needs alone.

Two embodiments of the invented apparatus are especially useful in a hospital drug distribution system, or HDDS. In one such embodiment, the tube and valve are an integrated unit. This embodiment is called the Integrated Tube-Valve, or ITV. Using an ITV makes the most sense when it is cost effective to return empty tubes to a drug refilling center for refilling. In such case, there is little advantage to disconnecting the valve prior to returning the tube for refilling, and indeed, it is advantageous that the drug refilling center test the valve portion of the ITV at the time of refilling. Such testing minimizes the frequency of valve malfunctions during subsequent HDDS operation.

In a second embodiment useful in an HDDS, the tube separates from the valve. This embodiment can be used when it is cost effective to discard empty tubes and order new ones, or when the empty tubes (without the valve) are returned to the drug refilling center for refilling. In such a case, the hospital disconnects and discards a tube when it becomes empty, orders a new tube with the same drug, and, when that new, full tube arrives, connects it to the valve. Alternatively, the hospital disconnects and returns the empty tube to the refilling center for refilling. The hospital preferably tests the valve's solenoids prior to connecting the new tube. To ensure smooth and continuous operation of the system, each drug has a backup tube on-line at the beginning of the day. Therefore, such valves (with their connected tubes) are arranged in a group of at least two—and preferably two—called a valve-unit, or VU. In a VU, the valves are constructed to ensure that all tubes within the VU store the same drug, as described below.

Still another embodiment of the invented apparatus is useful in a pharmacy drug distribution system, or PDDS. In this embodiment, known as the integrated elastic valve, or IEV, the valve consists of a molded elastic rubber sleeve mounted tightly upon the lower part of the drug tube. Small holes or slits in the lower portion of the drug tube are provided to accommodate portions of the elastic rubber sleeve that act as "shutter" and "catcher" doors controlling the dispensing of the medicinal units. Drugs are extracted, at a drug extraction station, from one tube at a time. At the extraction station, the valve is manipulated by a valve control mechanism including various solenoids. As noted, this embodiment is most useful in a PDDS, where each prescription consists of multiple units of a single medication. In such context, it is efficient to have one set of extraction solenoids (at the extraction station), and transport the needed drug tube, with its shutter and catcher doors, to the extraction station for extraction of the drugs.

BRIEF DESCRIPTION OF THE DRAWING

FIG. 1*a* shows front view of a pill tube according to the invention.

FIG. 1*b* shows side view of a pill tube according to the invention.

FIG. 1*c* shows section view of a pill tube according to the invention, along the lines "1*c*—1*c*" in FIG. 1*b*.

FIG. 13*a* shows a side view of a two-channel tube for pills, according to the invention.

FIG. 13*b* shows a side view of a four-channel tube for capsules, according to the invention.

FIG. 13*c* shows a cross-sectional view of a two-channel tube for pills, along the line 13*c*—13*c* in FIG. 13*a*, according to the invention.

FIG. 13*d* shows a cross-sectional view of a four-channel tube for capsules, along the line 13*d*—13*d* in FIG. 13*b*, according to the invention.

DETAILED DESCRIPTION OF THE INVENTION

Figures 2A, 2B:
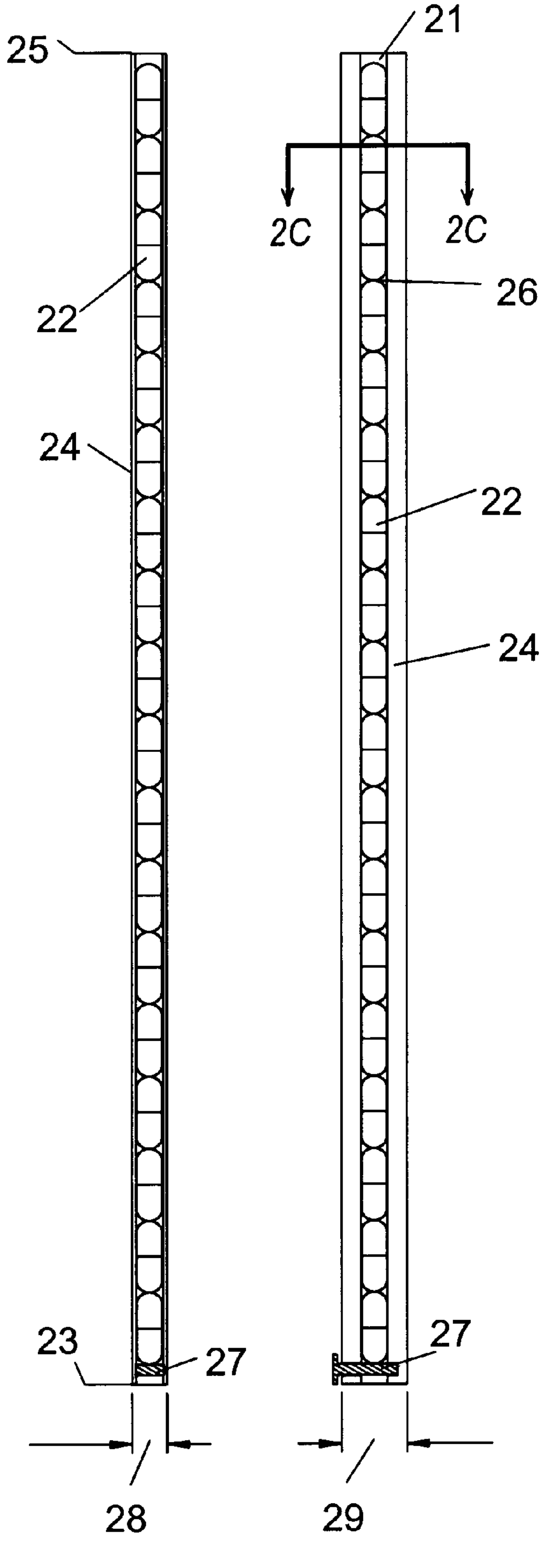
FIG. 2*a* shows front view of a capsule tube according to the invention.
FIG. 2*b* shows side view of a capsule tube according to the invention.

To assist in a better understanding of the invention, a specific embodiment of the present invention will now be described in detail. Although such is the preferred embodiment, it is to be understood that the invention can take other embodiments. This detailed description will include reference to FIGS. 1 through 18. Where appropriate, the same reference numerals will be used to indicate the same parts and locations in all the Figures unless otherwise indicated. It will be apparent to one skilled in the art that the present invention may be practiced without some of the specific details described herein. In other instances, well-known structures and devices are shown in block diagram form.

Drug distribution is generally accomplished in two different settings. The first is the hospital, where large numbers of patients must be served with a single dose of one or more medications several times daily. The second is the pharmacy, where patients require fulfillment of one or more prescriptions, each typically requiring a substantial number of units of the same drug.

According to the present invention, the packaging of the drugs and the device for extracting the same include a long, thin drug tube and a novel valve that extracts the required number of medicinal units from the tube in a fast and reliable manner. The first two embodiments of the tube and valve described below are especially useful in a hospital drug distribution system, or HDDS. The third tube-and-valve embodiment is especially useful in a pharmacy drug distribution system, or PDDS.

The tubes and valves are different for an HDDS versus a PDDS. As noted in the "SUMMARY OF THE INVENTION" section, a PDDS uses the IEV embodiment. When a particular drug is needed for a prescription the tube containing that drug is moved to the PDDS extraction station. All tubes are moved simultaneously in a carousel until the needed tube reaches the extraction station; hence, the tubes must be lightweight. Moreover, there is only one set of extraction solenoids—all are extant at the extraction station, and none are part of the tube or valve itself. This helps minimize tube weight. The tubes are preferably multi-channeled to maximize storage space within the tube and also to allow for different solenoids to perform the extraction when one channel runs out (see below). This reduces the frequency with which the solenoids of the extraction station must be replaced, as it reduces each solenoid's use.

An HDDS, by contrast, uses either the ITV or the VU embodiment: the ITV embodiment for when empty drug tubes with integrated valve are returned to the drug refilling center for refilling, and the VU embodiment for when empty drug tubes are disconnected from the valve and either discarded or returned for refilling. In an HDDS the tubes are stationary and each valve has its own control electronics, as there is no extraction station in the system; in essence, each valve or VU is its own mini extraction station, and often, more than one tube dispenses simultaneously. In this setting, whether the VU or the ITV embodiment is used, each valve has its own set of extraction solenoids.

2. Drug Packaging

Pills or tablets are thin disks or flat ovals or the like, in which the pill or tablet is itself the medicine. Capsules are hollow cylinders with semi-spherical ends, and the medicine is contained within the capsule, which is made of an inert ingredient which dissolves in the stomach to release the medicine. In this description, either pills, tablets or capsules will be referred to as "medical units".

In the invented device, medicinal units are packaged in long tubes, preferably approximately five feet long. The medicinal units are stacked inside the tube standing up, one on top of the other. The units touch each other at a single point located along the vertical centerline of the tube. In this regard, it is noted that two circles (pill edges) or spheres (capsule ends) touch each other only at a single point.

Referring to FIGS. 1*a* through 1*c*, pills (12) are packaged vertically within a pill tube (14) having a bottom end (13) and a top end (15) and a hollow interior (11), such that each pill touches each adjacent pill only at a single point (16). The pill tubes (14) are dimensioned to fit the pills, but in one embodiment can be approximately 0.4 inches (18) by 0.75 inches (19) in dimension. Likewise, referring to FIGS. 2*a* through 2*c*, capsules (22) are packaged vertically within a capsule tube (24) having a bottom end (23) and a top end (25) and a hollow interior (21), such that each capsule touches each adjacent capsule only at a single point (26). The capsule tubes (24) are dimensioned to fit the capsules, but in one embodiment can be approximately 0.4 inches (28) by 0.75 inches (29) in dimension.

In each drug tube (14, 24), up to several hundred medicinal units are stored, depending upon the units' dimensions. The significance of this manner of packaging is further elucidated below in the description of the method of extracting the medicinal units from the tubes by using a novel valve (see FIGS. 5–10*e*, 15–18). It is noted here, however, that because of the fixed placement of the medicinal units (12, 22), such that they touch only at a single point (16, 26), the medicinal units (12, 22) do not move and rub against each other during storage and handling. This minimizes chipping, flaking, powdering, or the clinging of particles to the dispensed units.

The tubes (14, 24) are preferably made of clear plastic, so their contents may be seen. For drugs that are sensitive to light, however, the tubes are preferably made of opaque plastic. The top end (15, 25) of each tube is permanently closed, and each tube has a removable seal (17, 27) at the bottom end (13, 23). In the VU embodiment the tube arrives at the hospital without a valve and must be coupled to a valve while the seal (17, 27) is still in place, as the tube has nothing to hold the medicinal units inside once the seal is removed. Therefore, the seal is removed after the tube is coupled to a valve, at which time a closed catcher door on the valve holds the units in the tube. For this reason, the seal on the bottom end (13, 23) of a tube in the VU embodiment is a pull-out tabbed door: it holds the medicinal units in the tube while the tube remains unattached to a valve, and is removed by pulling on its tab once the tube is coupled to a valve. In the ITV and IEV embodiments, the ITV's or IEV's shutter door holds the medicinal units inside the tube, and the seal (FIG. 10*b*, 107) is simply a pull-off seal (as opposed to a pull-out tabbed door) for keeping dust and the like out of the tube during shipping and handling. The attendant pulls the seal off before inserting the ITV into the HDDS, or the IEV into the PDDS, as the case may be.

Figure 2C:
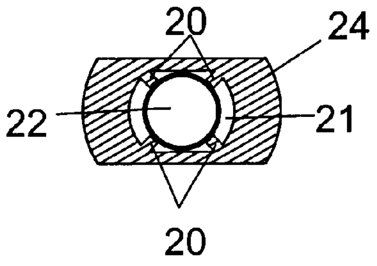
FIG. 2*c* shows section view of a capsule tube according to the invention, along the lines "2*c*—2*c*" in FIG. 2*b*.

Referring to FIGS. 1*c* and 2*c*, cross-sectional views of the tubes are shown. The internal chamber (11) of a pill tube is substantially rectangular, while the internal chamber (21) of a capsule tube is substantially circular. As shown in FIG. 1*c*, for fast, smooth movement of pills (12) through a pill tube (14), the inside surface of the tube is corrugated, having inward-pointing "wings" (10) creating an air space between the medicinal unit (12) and the tube wall. Likewise, referring to FIG. 2*c*, the inside surface of a capsule tube has similar wings (20).

Figure 3A:
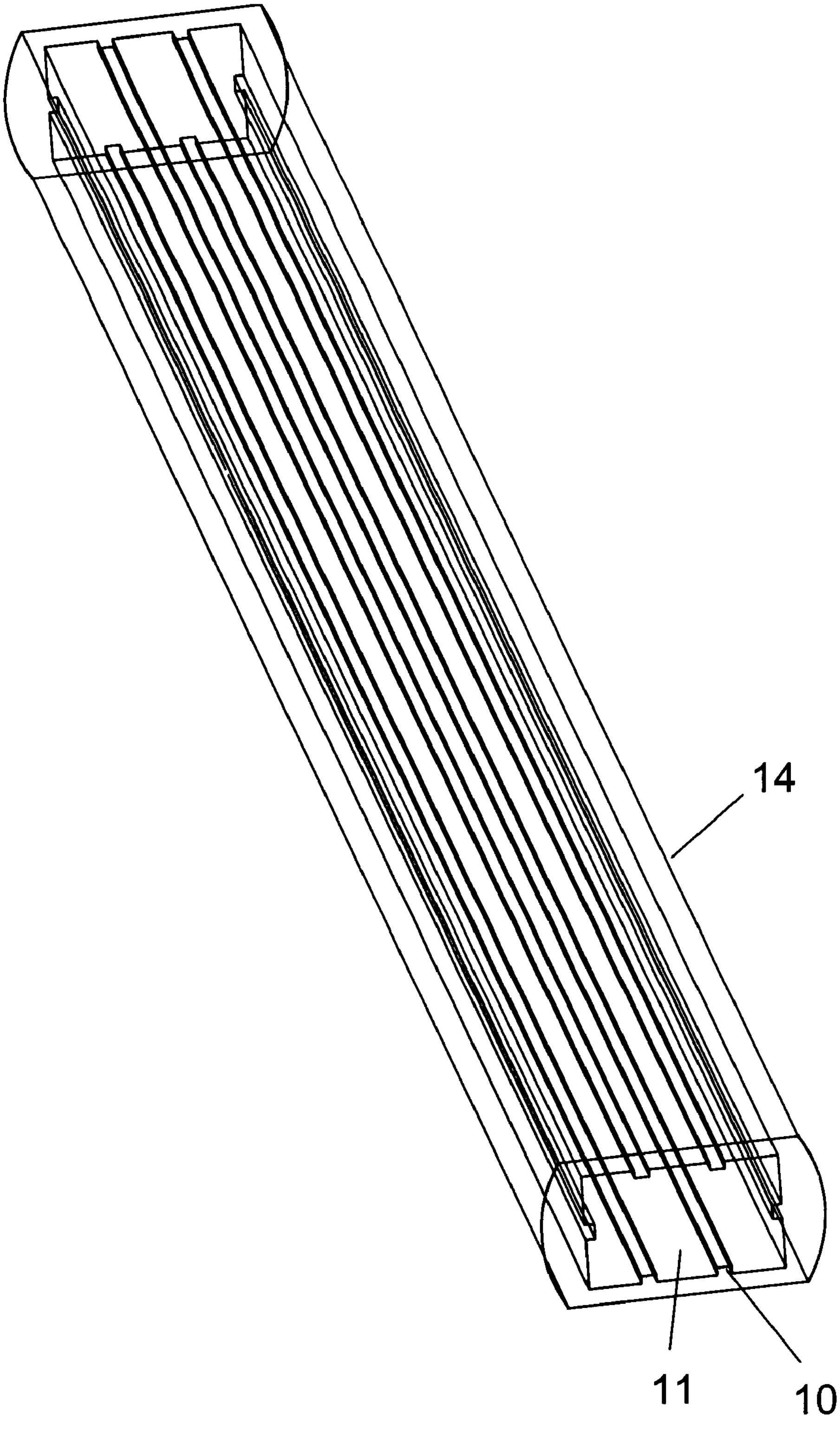
FIG. 3*a* shows a perspective view of a section of pill tube according to the invention.
Figure 3B:
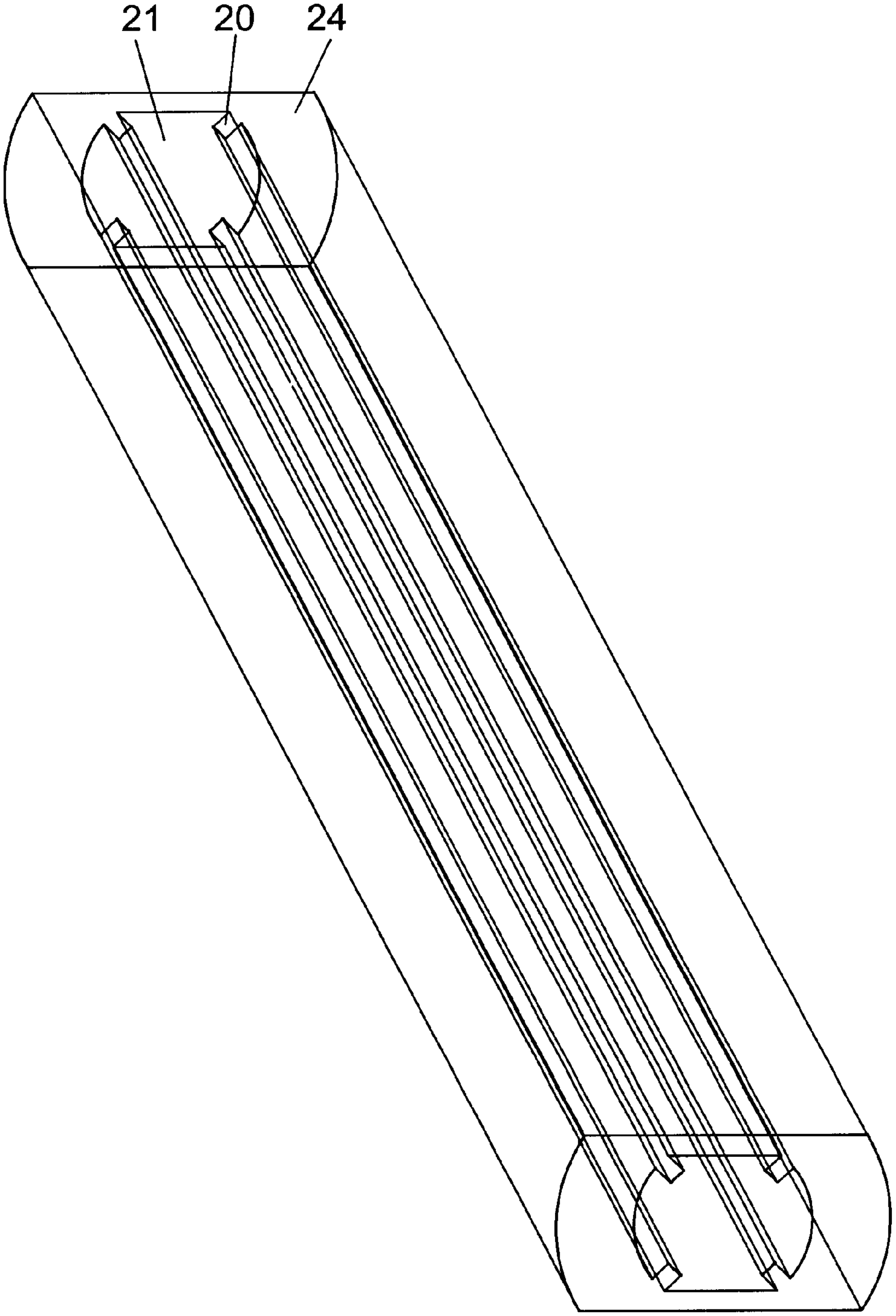
FIG. 3*b* shows a perspective view of a section of a capsule tube according to the invention.

For another view, FIGS. 3*a* and 3*b* show perspective views of a section of pill and capsule tube, respectively, as explained above.

Such corrugation is beneficial for several reasons. First, it minimizes the friction between the medicinal units and the inside walls of the channel through which the units travel. Second, it reduces electrostatic sticking of the units to the tube walls, as the units touch the walls at only a few points. Third, it allows air to move freely around the units inside the tube. If the air could not move freely, a lower pressure would be generated momentarily at the top of the tube after a unit is discharged from the bottom and the stack of medicinal units slides downward within the tube. This would cause a slight delay in the free-fall of the rest the column of medicinal units. Additionally, it eliminates jamming of the medicinal units in the tube. In a smooth-wall channel, such jamming can occur when fragments of broken medicinal units, or other small dust particles, get stuck between the medicinal units and the wall. With the corrugated interior, however, such particles fall down along the openings between the medicinal units and the wall.

Figure 4A:
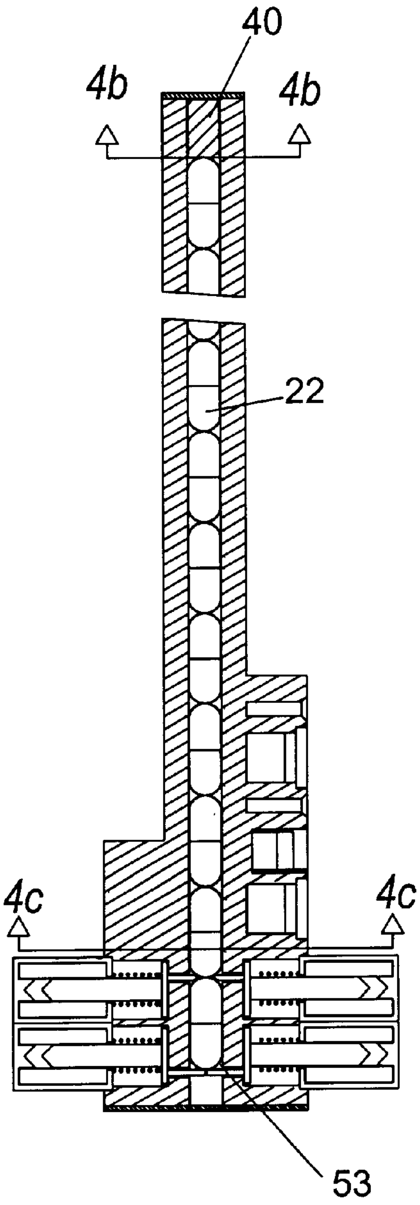
FIG. 4*a* shows side cut-away view of a tube and valve having a follower-weight according to the invention.
Figure 4B:
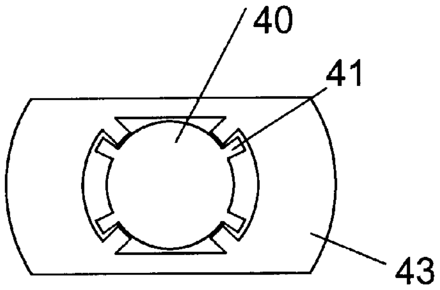
FIG. 4*b* shows a section view of a tube and weight, along the lines 4*b*—4*b* of FIG. 4*a*.
Figure 4C:
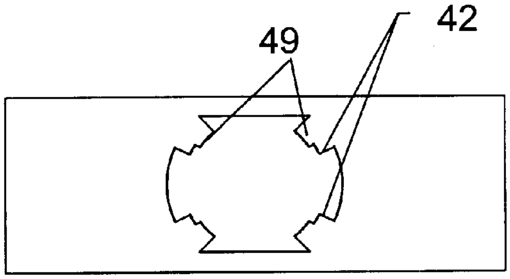
FIG. 4*c* shows a section view of a valve, along the lines 4*c*—4*c* of FIG. 4*a*.
Figure 4D:
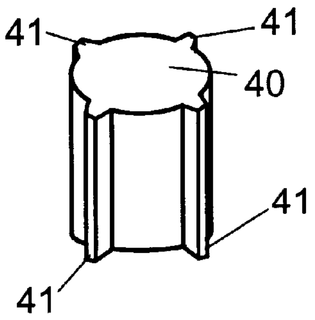
FIG. 4*d* shows a perspective view of a follower-weight according to the invention.

Referring to FIGS. 4*b*–4*d*, to further assure free falling of the medicinal units even when only one or two are left in the tube, on top of the column of medicinal units, there is a metal "follower-weight" (40) that falls with the medicinal units. The vertical surface of the follower-weight (40) has thin "shoulders" (41) at opposite sides, which protrude into the air space between the inward pointing wings (49). The shoulders are thin enough that they do not interfere with the upward movement of air within the air space as the column of medicinal units falls. Preferably, there are four such shoulders (41) disposed in two pairs across from each other, so that two fit between one pair of adjacent wings, and the other two fit between the two other adjacent wings across the channel from the first two wings. Preferably the shoulders extend from one flat surface of the follower-weight to the opposite flat surface, so that they cannot easily be broken. In this manner, as well, the entire follower weight is symmetrical relative to the horizontal bisecting plane, and hence, if it is be placed into the tube "upside down" there is no difference from right-side up.

As shown in FIG. 4*c*, at the bottom of the drug tube, the interior of the tube includes "shelves," (42) adjacent to the inward-pointing wings (49) positioned such that the shoulders (41) of the follower-weight (40) come to rest upon them when the tube becomes empty. These shelves (42) do not interfere with the movement of the medicinal units from the tube into the valve, as they do not project into space in which the column of medicinal units moves.

When the follower-weight (40) reaches the bottom of the tube so that the last medicinal unit is in the valve chamber, the follower-weight (40) stops and is prevented by the shelves (42) from entering the valve chamber. Moreover, the shelves (42) protrude sideways for only a short distance from each wing, at the bottom of the drug tube (14, 24, 43, 161, 171). In this way, (a) the shelves (42) are small and hence do not materially interfere with air movement upwards as the medicinal units fall, and (b) it does not matter which pairs of wings (20) the shoulders are placed between, as there will always be a shelf (42) at the bottom of the tube to stop the follower-weight (40) from falling into the valve chamber (53).

There are two ways that the drug distribution system detects that a tube is empty. First, control electronics of each valve keep track of the number of units left in the tube and valve at any given time. When that number reaches zero, the tube and valve are empty, at which point the valve's control electronics signal a controlling computer that the tube needs replacement. Alternatively, or in addition (for added confirmation), the follower-weight is made of a magnetic metal. There is a sensor located at the bottom of the tube above the valve, that detects the presence of the follower-weight adjacent to it within the tube. When the follower-weight is detected by the sensor, the valve's control electronics record the same and, after discharging the valve one more time, signal the controlling computer that the tube needs replacement.

In the VU embodiment, when the replacement tube is ultimately placed atop the valve, the valve's control electronics causes the catcher door to open so that one medicinal unit falls into the valve's chamber and is ready to be discharged. Then the catcher door is closed. In this way, immediately after insertion of the replacement tube, the valve becomes "primed" to start discharging when necessary.

Referring once again to FIGS. 1–2, the cross section of a tube for use in an HDDS is essentially rectangular, but with the short sides slightly rounded and convex. This shape has the advantages of strength and lightness of weight: the straight edges make the side walls thin and lightweight, while the bulk on the ends gives the tube strength against breakage. The straight edges also facilitate sliding the tube into the HDDS array of tubes. In an HDDS, all tubes have identical outside dimensions, no matter what size medicinal units are dispensed from within, thus enabling the equipment that handles the tubes to handle all tubes no matter what size medicinal unit is inside.

Referring to FIGS. 13*a*–13*d*, tubes (130)(135) for use in a PDDS are rectangular. In the interior, there are either two channels for the medicinal units (as in tube (130), FIG. 13*a*) or four channels (as in tube (135), FIG. 13*b*)—two channels (131) for pills, or four channels (136) for the longer, thinner capsules. As with an HDDS, in a PDDS all tubes have identical outside dimensions. Thus, the equipment handling the tubes handles all tubes, independent of the dimensions of the medicinal units inside. The dimensions of the channel inside the tube fit the dimensions of the medicinal units to tight tolerances.

Preferably, there would be at least 25 to 30 different types of drug tubes in each embodiment (IEV, ITV, VU), each tube for a medicinal unit with different dimensions. Each such drug tube is marked with the dimensions of the medicinal unit for which it can be used. For cross checking, the footprint of the pill or capsule is preferably stamped upon the outside of the tube.

After a drug tube is loaded with medicinal units, a label is placed on the outside of the tube. The label describes, in human-readable format, the drug, number of units in the tube, current date, drug's expiration date, and any other needed information, as discussed more fully below. In addition to the human-readable label, machine-readable identification means (chip (102), bar-code (132)) containing the same information is placed on the tube, to be read at the destination hospital or pharmacy by the drug distribution system used there. Such identification means is preferably an integrated-circuit memory chip (102) for ease of reading by a computerized reader of the HDDS or PDDS. Alternatively, the machine-readable identification means is a barcode, to be read by a barcode reader of the HDDS or PDDS. In that event, the barcode is printed either on the above-referenced label containing the other information, or on a separate sticker affixed to the outside of the tube.

3. Hospital (HDDS) Embodiments (i) The Single-Unit Valve

The invented apparatus includes a novel valve for discharging one medicinal unit at a time, referred to herein as a "single-unit" valve. The valve is located at the bottom of the tube, and receives one medicinal unit at a time, directly from the tube, as the unit falls into the valve. In this manner, the valve receives and rapidly discharges from the tube one unit at a time upon command. The rate of discharge depends upon the size of the medicinal units. The range varies from approximately fifteen units per second for small medicinal units to approximately six units per second for large units, such as long capsules. The valve discharges the medicinal units from the tube with high reliability without harming the units. The extraction of a single unit from the tube is possible because of the unique packaging of the units in the tube. In particular, because the medicinal units are arranged single file and touch each other only at a single point, there is a crevasse between the units that facilitates their separation.

Figure 5A:
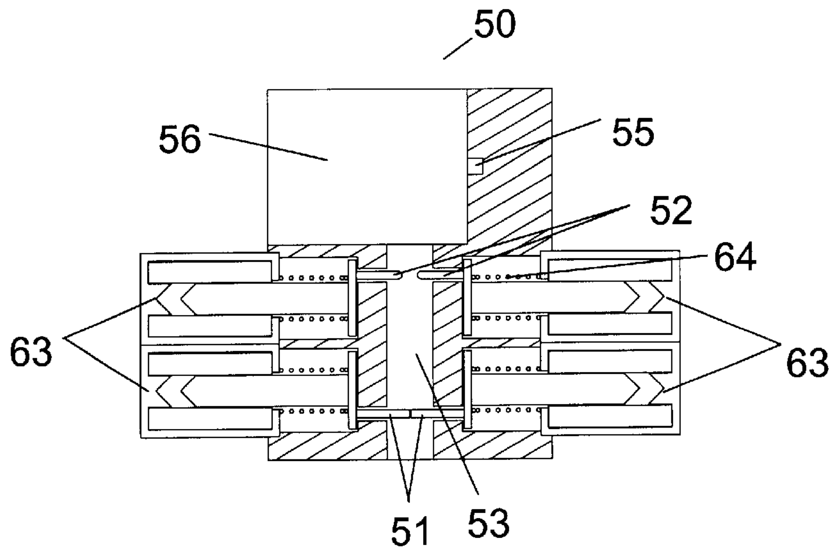
FIG. 5*a* is a cross-sectional view of a single-unit valve according to the invention.
Figure 5B:
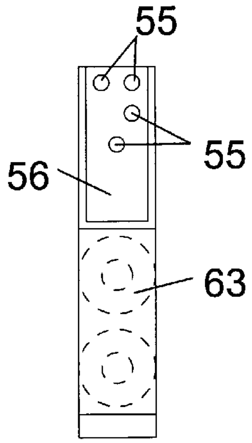
FIG. 5*b* is a front view of a single-unit valve according to the invention.

Referring to FIG. 5*a*, a cross-section of a single-unit valve is shown. The valve (50) includes two doors located one above the other. The bottom door (51) is referred to as the shutter; the top door (52) is referred to as the catcher. The space between the shutter and the catcher is the chamber (53). The chamber (53) holds one medicinal unit. Accordingly, the height of the chamber, which is the distance between the shutter (51) and catcher (52), equals the diameter of one pill or the length of one capsule, as the case may be.

Figure 6A:
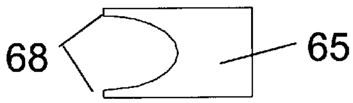
FIG. 6*a* shows a catcher door for use in a single door embodiment for pills according to the invention.
Figure 6C:
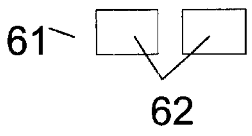
FIG. 6*c* shows a catcher door for use in a double door embodiment for pills according to the invention.
Figure 6B:
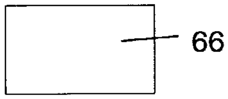
FIG. 6*b* shows a shutter door for use in a single door embodiment for pills according to the invention.
Figure 6D:
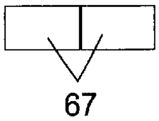
FIG. 6*d* shows a shutter door for use in a double door embodiment for pills according to the invention.

The door (shutter or catcher) is a single door, or a double door. Referring to FIGS. 6*c* and 6*d*, a double door (61) is made up of two half-doors (62). As shown in FIG. 5, each half-door is actuated by a solenoid (63) loaded with a spring (64). It is pulled out (opened) by the solenoid (63) and pushed in (closed) by the pressure of the spring (64). FIGS. 6*a* and 6*b* show a single door (65). Like each half-door (62), the single door (65) is also opened by a solenoid and closed by a spring.

The advantage of two half-doors is that the time to open and close the doors is reduced. Additionally, a catcher comprised of two half-doors has an advantage over a single door in the case of very small pills. The reason is that, with very small pills, the gap between the pills is shallow, and hence, the door cannot extend very deeply into the space between two pills. This makes it possible for a small pill to slip around a closed single door under some circumstances (such as the pill being slightly deformed). The disadvantage of using a double door is that it requires twice as many solenoids as a single door.

Referring to FIGS. 6*c*, 6*d*, 6*g* and 6*h*, in the double-door style, the two half-doors (62) are substantially rectangular, and, in the case of pills, move back and forth in a direction parallel to the pill's wide (i.e., circular) surface. Referring to FIGS. 6*a*, 6*b*, 6*e* and 6*f*, a single shutter door is substantially rectangular, but the shape of a single catcher door is that of a rectangle with a half-oval cut out, such that two prongs (68) are formed. This is known as the two-pronged single catcher door. For the ITV and VU embodiments, all single catcher doors are two-pronged single catcher doors. In the case of pills, the direction of movement of the two-pronged single catcher door is perpendicular to the pill's wide (circular) surface. When the two-pronged single catcher door closes, the two prongs protrude into the tube's interior cavity, into the open space between two pills or capsules, thus catching the next pill or capsule from falling down into the valve chamber (53).

Figure 6E:
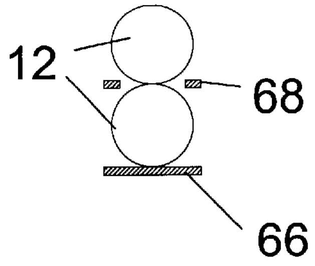
FIG. 6*e* shows a side view of the single door for pills according to the invention.
Figure 6F:
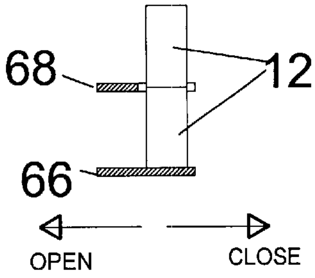
FIG. 6*f* shows a front view of the single door for pills according to the invention.
Figure 6G:
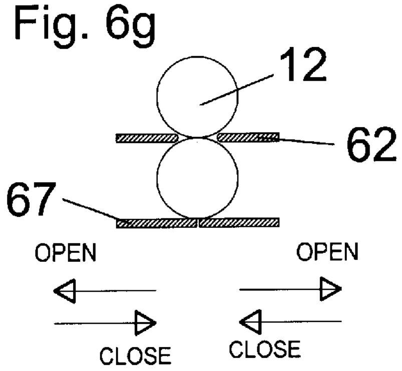
FIG. 6*g* shows a side view of the double door for pills according to the invention.
Figure 6H:
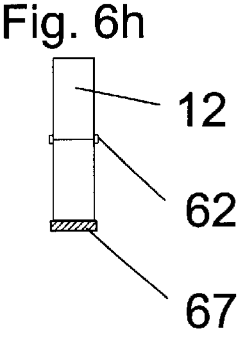
FIG. 6*h* shows a front view of the double door for pills according to the invention.

The single-unit valve functions as follows. To load the chamber, the catcher is opened, thus allowing all medicinal units to slide downward, with the bottom unit resting upon the shutter. The catcher is then closed. As noted, it closes without harming the medicinal units, as they are touching each other only at a single point at the vertical centerline of the channel, such that there is an open space between any two adjacent medicinal units. The catcher is inserted into this open space very close to the units, as shown in FIG. 6*e*. At this time, the chamber is now loaded with a single unit, the shutter is closed and the valve is ready to discharge the loaded unit upon command. When the valve receives such command, it proceeds through four steps to complete a cycle, as follows.

First, the valve discharges the unit from the chamber by applying a current pulse to the shutter solenoid. The pulse's duration is equal to the time it takes to open the shutter door plus the time it takes the medicinal unit to fall out of the chamber. When the shutter is open, all the other units in the tube are held in place by the closed catcher.

Second, the shutter solenoid current pulse is terminated, resulting in the shutter being closed by the pressure of the spring. There is a slight time delay required for the shutter to transition from the open position to the closed position.

Third, a current pulse is applied to the catcher solenoid. This causes the catcher to open and the chamber to be reloaded with a new medicinal unit as the column of units falls. The current pulse is applied for a duration that is substantially equal to the time it takes to open the catcher plus the time it takes the medicinal units in the tube to slide down a distance equal to the diameter of the pill or the length of the capsule, as the case may be.

Fourth, the catcher solenoid current pulse is terminated, resulting in the catcher being closed by the pressure of the spring. There is a slight time delay required for the catcher to transition from the open position to the closed position. At this point, the chamber is now reloaded, both doors are closed, and the cycle is complete.

Figure 8:
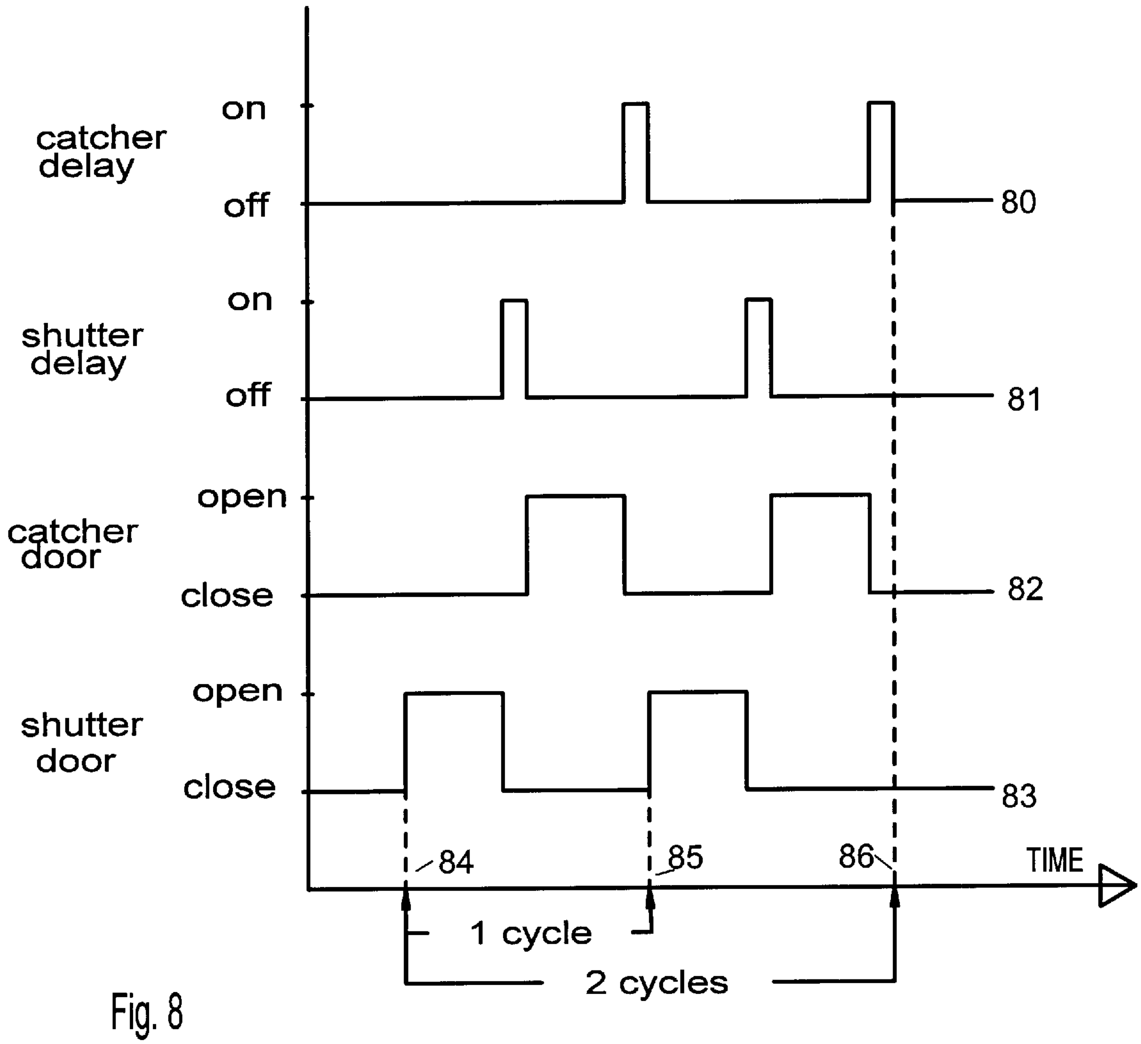
FIG. 8 illustrates the time sequence for two extraction cycles according to the invention.

Referring to FIG. 8, the time sequence of two cycles, starting at times (84) and (85) can be seen, with the two cycles completed at time (86). Line (80) shows the catcher delay, line (81) the shutter delay. The control pulses for the catcher door and shutter door are shown by lines (82) and (83), respectively. The time it takes to open or close either door is approximately 10 to 15 milliseconds (msec), depending upon the distance the door must move in and out. The time it takes for the medicinal unit to fall out of the chamber is substantially equal to the time it takes for the entire column in the tube to slide down the length of one unit. Because the sliding down of the medicinal units is a free fall, the time for such sliding of one unit's length depends only upon the units' size, and not their mass. This time interval is as little as approximately 13 msec for a small pill 0.25 inch in diameter, to as much as 65 msec for a long capsule 0.85 inch in length. The total time it takes for the valve to complete one cycle ((84) to (85), or (85) to (86)) is approximately 56 msec for small pills 0.25 inch in diameter, to as much as 180 msec for long capsules 0.85 inch in length.

Figure 7:
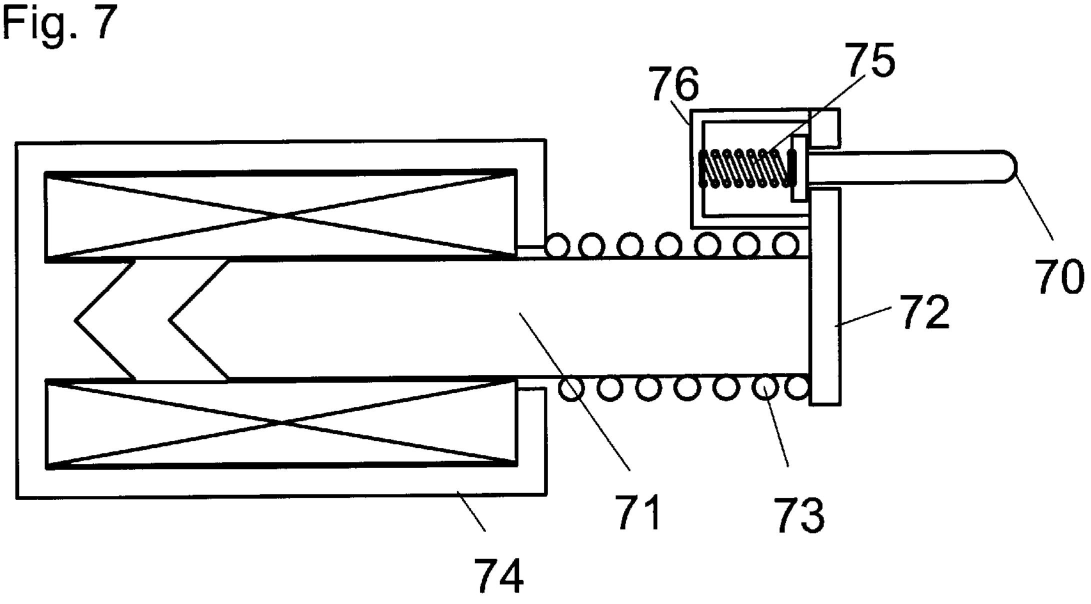
FIG. 7 shows strong and weak springs of a catcher door according to the invention.

Referring to FIG. 7, the valve has a unique design that ensures that the catcher door (70) does not chip, shear or otherwise harm the medicinal unit even if it should unexpectedly pinch the unit. This might happen, for example, if one of the pills is slightly broken, such that its diameter is slightly reduced; when that pill drops into the chamber, the pill above it, which rests on it, is in a position where, when the catcher (70) closes, it will pinch the side of the pill above the broken pill, rather than sliding between it and the broken pill. Part of the solenoid is a moving pin (71) with a vertical plate (72), which is loaded by a "strong" loading spring (73) that keeps the door closed when the solenoid (74) is not activated. When the solenoid (74) is activated, the pin (71) moves outward and the door opens. When the solenoid (74) is de-activated, the strong spring (73) closes the door. Note, however, that the door (70) is connected to the plate (72) by a weak spring (75) contained within a spring housing (76). Hence, if the door (70) closes and pinches a medicinal unit, the weak spring (75) allows the door (70) to retract, and hence the force exerted upon the side of the pill or capsule is small; the force is enough to hold the pill or capsule in place without permanently damaging it. If a pill is thusly pinched by the door (70), the pill (and the column of pills above it) either stays in place or moves upwards in reaction to the force of the door. Either way, the pill is not damaged. If a capsule is thusly pinched by the door (70), the door (70) may temporarily indent the side of the capsule. The door (70) will, however, hold the capsule in place, and the side of the capsule will resume its previous shape when the force from the door (70) is no longer exerted upon it.

The dimensions of a single-unit valve, as shown in FIG. 5, are preferably 0.5 inch wide, 3.5 inches deep, and 2.4 inches high. Because the medicinal units come in approximately 30 different sizes, there are approximately 30 different valves and tubes. Such valves' and tubes' external dimensions are the same, independent of the size of the medicinal units within. The valves and tubes differ only in their internal dimensions. Thus, when reference is made to valves or tubes of different sizes, it is meant that the internal dimensions are different, because, as noted, the external size and shape of all tubes and valves is substantially identical.

As noted, use of disconnecting tubes is most advantageous in the context of a valve-unit, or VU, with multiple valves (preferably two valves), and hence multiple places for drug tubes to connect to the VU. Preferably there are two valves in a VU. One valve is the primary or active valve and the other is the backup valve for when the primary malfunctions or runs out of medicinal units. In the VU embodiment the tube disconnects from the valve.

Figure 9A:
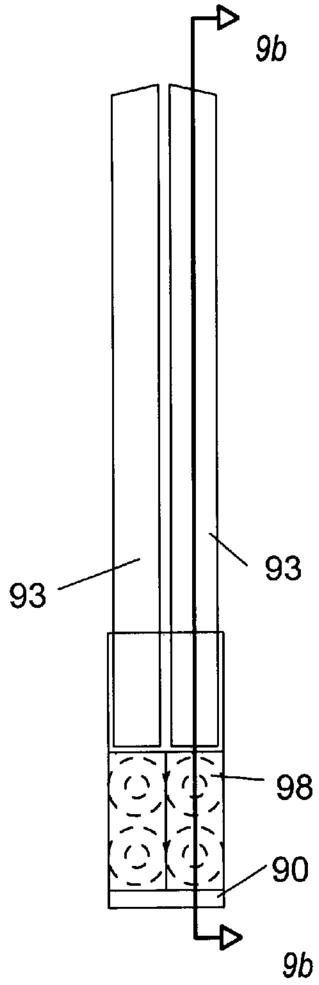
FIG. 9*a* shows a front view of a valve-unit (VU) according to the invention.
Figure 9B:
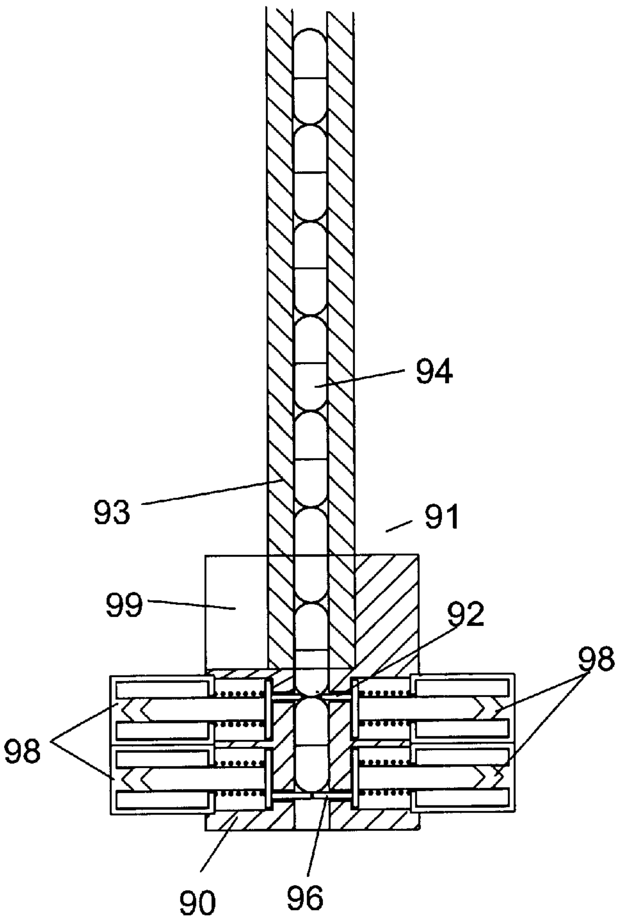
FIG. 9*b* shows a lateral cross section of a valve-unit (VU) according to the invention along lines 9*b*—9*b* of FIG. 9*a*.
Figure 9C:
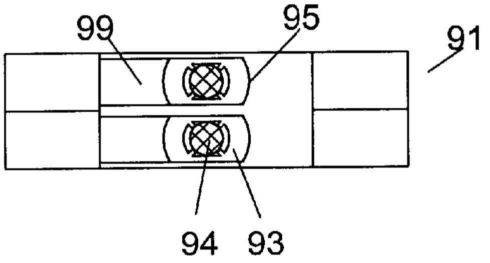
FIG. 9*c* shows a top view of a valve-unit (VU) according to the invention.

Referring to FIGS. 9*a*–9*c*, this embodiment includes a base (90) with the valves (91) and a place (99) for tubes to be inserted, one tube (93) on top of each valve (91). As discussed above with respect to FIG. 5*a*, the valve (91) is operated by solenoids (98), working catcher doors (92) and shutter doors (96), for dispensing the capsules (94).

Only one size tube can be attached to a particular valve, as the internal dimensions of the tube must match those of the valve. The tube (93) is coupled to a valve (91) by pushing the tube (93) into the receiving portion (99) of the valve (91) so that it is flush against a back wall (95) of the base (90), and rests firmly on top of the valve (91). To ensure that the internal dimensions of the tube (93) and valve (91) match, each size tube has a unique pattern of grooves, bumps, or pins on the side that lies flush against the back wall (95) of the base. The back wall (95) has a mating pattern of grooves, depressions, or holes (55, FIG. 5*b*) to accommodate the tube's grooves, bumps or pins.

(ii) The Integrated Tube-Valve, or ITV

The above-described embodiment, in which an empty tube is disconnected from its valve and is subsequently replaced by a full drug tube, is especially advantageous where empty tubes are discarded. In such situation, it would be wasteful to discard the valve portion of the invented apparatus, simply because the tube had become empty.

In an alternate scenario, however, tubes are not discarded but are re-filled—say, at a drug refilling center—and then shipped to the same or a different hospital or pharmacy. In that event, it is advantageous not to separate the valves from the tubes each time refilling is required. Instead, the valve and the tube form one unit, known as the Integrated Tube-Value, or ITV, and the entire ITV is shipped to and from the drug refilling center each time refilling of the tube is needed. Preferably, the drug refilling center tests the ITV's solenoids upon refilling of the tube, to ensure that they function properly before the ITV is shipped to a hospital or pharmacy. Such testing is advantageous as the hospital's or pharmacy's drug distribution system is likely to be composed of hundreds of ITVs, all of which must function properly.

Figure 10A:
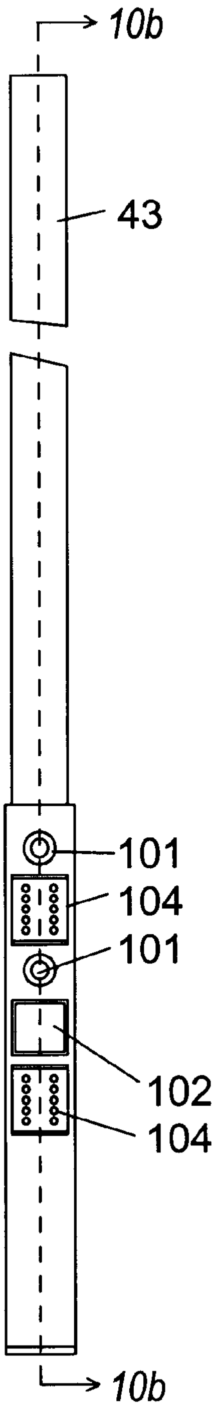
FIG. 10*a* shows a front view of an integrated tube-valve (ITV) according to the invention.
Figure 10B:
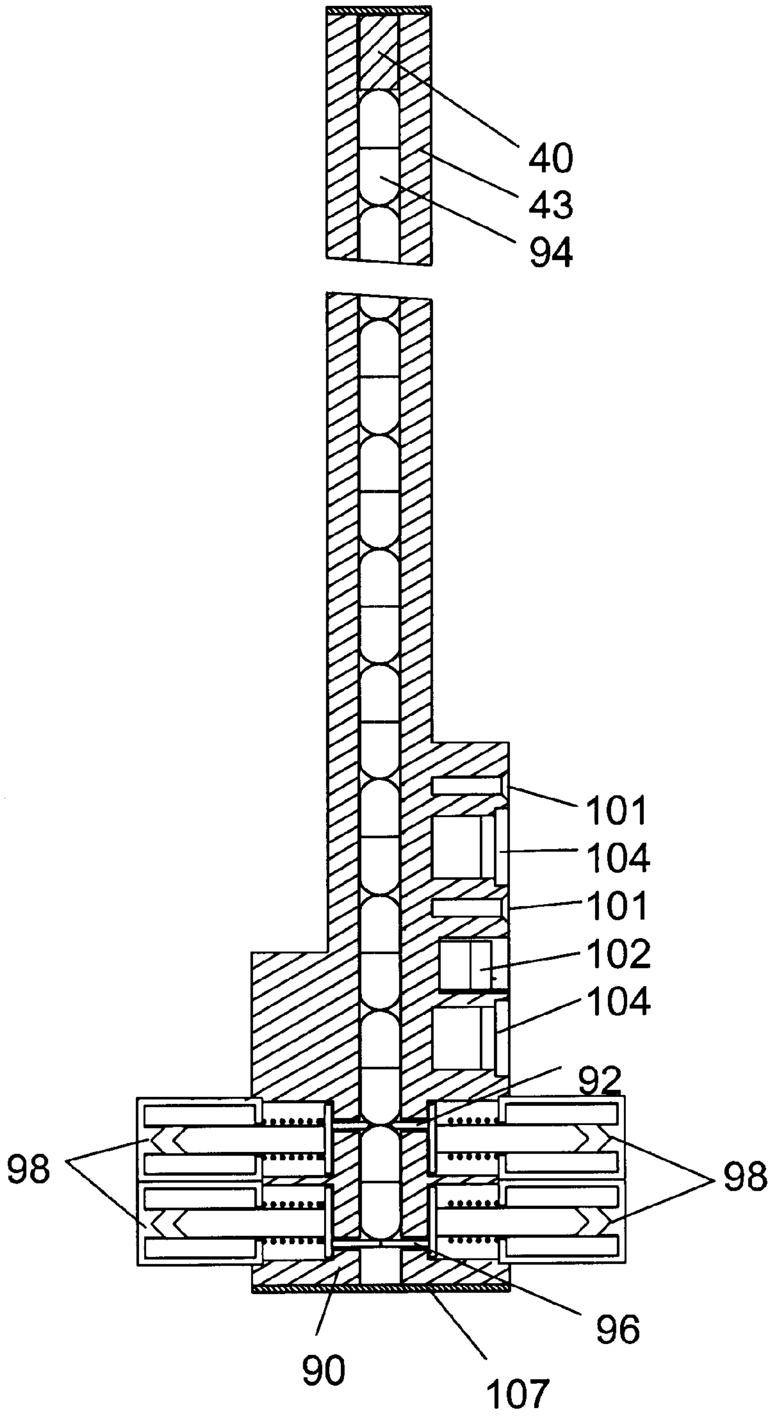
FIG. 10*b* shows a sectional view along lines 10*b*—10*b* in FIG. 10*a* of an integrated tube-valve (ITV) according to the invention.

Referring to FIG. 10*a*, an ITV is shown. Each ITV has means by which it is connected to a drug distribution system ("DDS"). Preferably, two connecting-pin holes (101) on the ITV engage with pins on the DDS to hold the ITV in place. Electrical connectors (104) allow for communication between the ITV and the DDS. This allows for simple and fast replacement of empty ITVs.

Additionally, each ITV has a means for identifying itself to the DDS. Such identification information preferably includes the name and code of the drug, the drug's expiration date, the quantity of units within the tube, the filling date, and indicia of the hospital, nursing home, or other company or institution, that ordered the drugs. In one embodiment, there is a barcode sticker on the ITV, and the DDS has a barcode reader that reads the sticker to glean the identification information. Preferably, however, an integrated-circuit read/write memory chip (102) is mounted on the ITV. This embodiment is shown in FIG. 10*a* through 10*d*.

When an ITV is installed in a DDS, the DDS reads the information stored via the above-referenced identification means. First, a local control unit reads the data, and stores it in a local processor that controls all ITVs or VUs in the module (typically, 100 ITVs or 50 VUs). Then, a microprocessor local to the module forwards the data to the main controlling computer. The DDS's database of all the drugs and their locations within the DDS is updated to include the newly installed ITV.

When an ITV is refilled at a drug refilling center, the memory chip is loaded with the above-referenced data regarding the medicinal units placed into the tube. This feature has a number of advantages:

First, it does not matter at what position the ITV is subsequently installed within the DDS because, by reading the stored information in the memory chip, the control system learns where each medication is located within the system.

Second, the database is updated automatically upon ITV installation, thus saving time and protecting the system from human error during the procedure for replacing or installing drugs tubes in the DDS.

Third, the procedure for changing the layout of the medication in the DDS, or for adding new drugs, is fast, simple and protected from human error.

It is noted, however, that, although any given ITV can be plugged into the DDS at any open slot, the two (primary and backup) ITVs containing the same drug should be mounted side by side, so that when one empties out, the other becomes the active valve and continues dispensing the same drug. This is especially important if the first active tubes empties out in the middle of filling a medication cup.

Figure 10C:
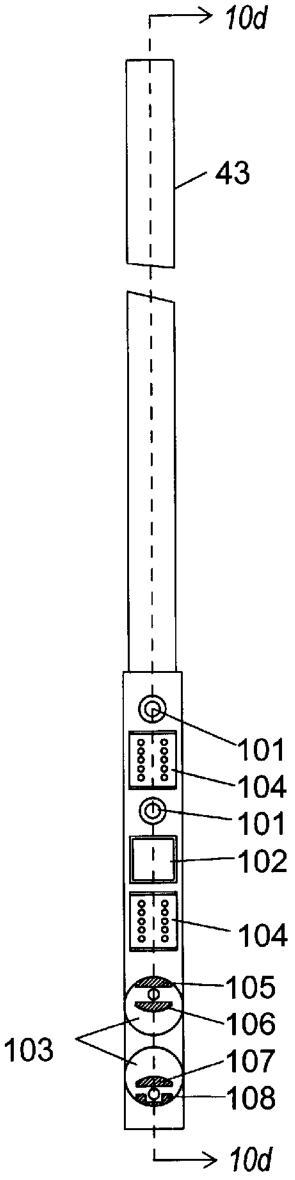
FIG. 10*c* shows a front view of an integrated tube-valve (ITV) according to the invention, showing the closure confirmation system (CCS).
Figure 10D:
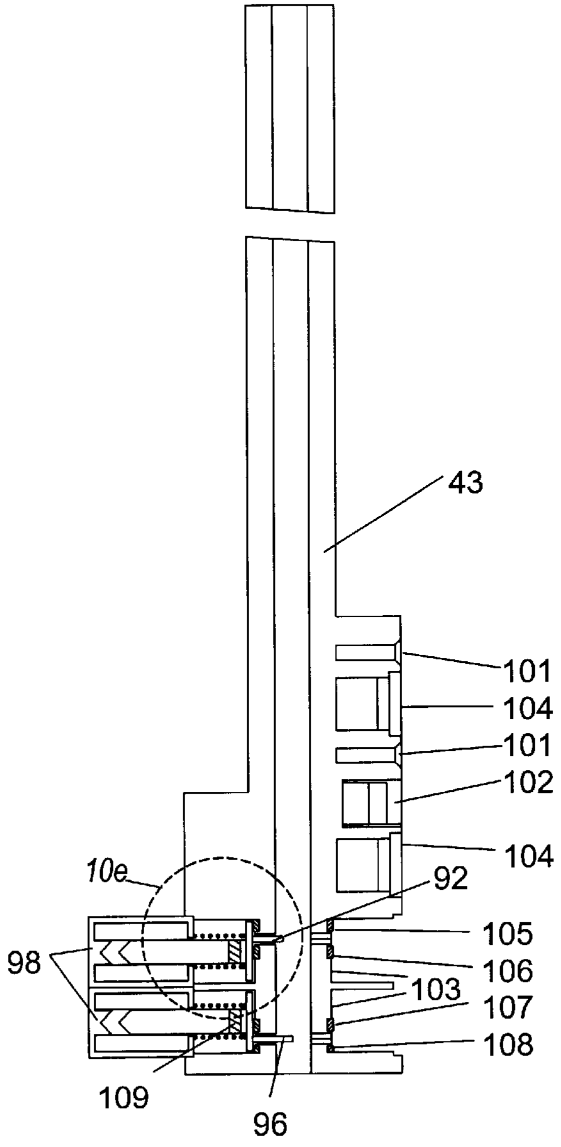
FIG. 10*d* shows a sectional view along lines 10*d*—10*d* in FIG. 10*c* of an integrated tube-valve (ITV) according to the invention, showing the closure confirmation system (CCS).
Figure 10E:
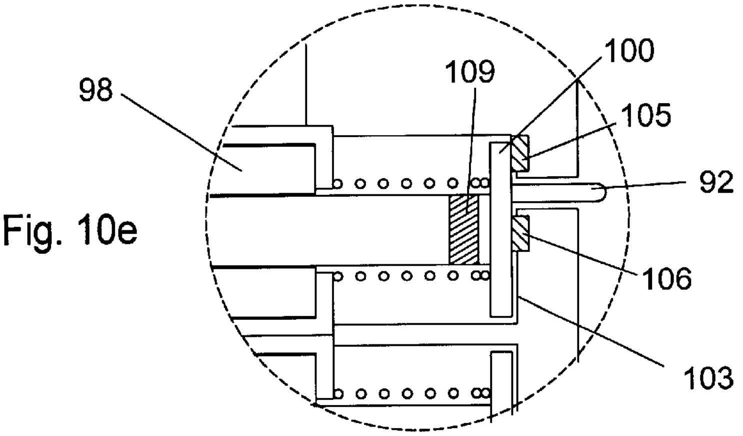
FIG. 10*e* shows a detail of the area enclosed by dotted lines 10*e* in FIG. 10*d*.

The ITV's valve, or each valve of a VU, as the case may be, preferably includes a closure confirmation system (CCS) that confirms the closure of the catcher and the shutter doors, as shown in FIGS. 10*c* through 10*e*. The CCS guarantees that the shutter (96) does not open before the catcher (92) is closed, or vice-versa, thus preventing an uncontrolled free-fall of the drugs out of the tube. Referring to FIG. 10*c*, the CCS includes two half disk copper electrodes for each solenoid—(105) and (106) for the catcher (92), (107) and (108) for the shutter (96). These electrodes are embedded in the solenoid cavity wall (103). Preferably, an upper electrode in each solenoid cavity (105), (107) is connected in parallel to the positive (+) terminal of a power source (not shown) of, preferably, 5 volts, while the lower electrode (106), (108) in each solenoid cavity is connected separately to the negative (−) terminal via a resistor (not shown) of, preferably, 1,000 ohms. The resistor is used as a sensor: a zero voltage across it indicates that the door is open, while a high (5-volt) voltage across it indicates that the door is closed. Referring to FIG. 10*e* as an example, when the catcher (92) is closed the metal base (100) of the door (92) shorts the upper electrode (105) to the lower electrode (106), which closes the current loop, thus causing a 5-volt signal to appear across the resistor. The shutter and catcher doors are electrically insulated (109) from the main solenoid.

During the above-described extraction cycle, the valve's control electronics only issue a command to open the shutter if the catcher is closed, and vice versa—the valve's control electronics do not allow both valve doors, shutter and catcher, to be open at the same time. This prevents uncontrolled spilling of the medication out of the tube. It also has a subtler advantage, namely, that if a non-standard-size capsule or a broken pill is present in the chamber, the catcher door is prevented from shutting, thus causing the valve to "malfunction," and requiring clearing of the malfunction before any more medicinal units are dispensed from that valve. This ensures that non-standard capsules or broken pills are not dispensed to patients.

The ITV also includes two multi-pin connectors (104), to connect the solenoids (98), the CCS, and the memory chip (102) to a tube control system of the DDS.

(iii) Use Within an HDDS

The above-described ITV is especially suitable for use within a hospital drug distribution system, or HDDS. The reason relates to the fact that the control electronics are repeated for each tube. Ordinarily, such repetition might appear wasteful, as the DDS could otherwise cause the tubes and valves to be brought to the control electronics on an as-needed basis. As will be seen below, such is the case in a DDS adapted for use in a customer pharmacy, at which customers arrive throughout the business day with prescriptions that need to be filled with only one drug. In a hospital setting, by contrast, dozens if not hundreds (or even thousands) of patients need single-dose provisions of one or a few drugs at pre-determined times of the day. The most efficient manner of using the invented device for fulfillment of such needs, is for each tube to have its own valve and valve-control electronics, and dispense one or a few medicinal units from one or several tubes, as required, for each patient. Furthermore, such dispensing must be done in a coordinated manner for hundreds of patients simultaneously, in a manner that guarantees each patient gets exactly the right number of medicinal units from the right tube(s).

Figure 12:
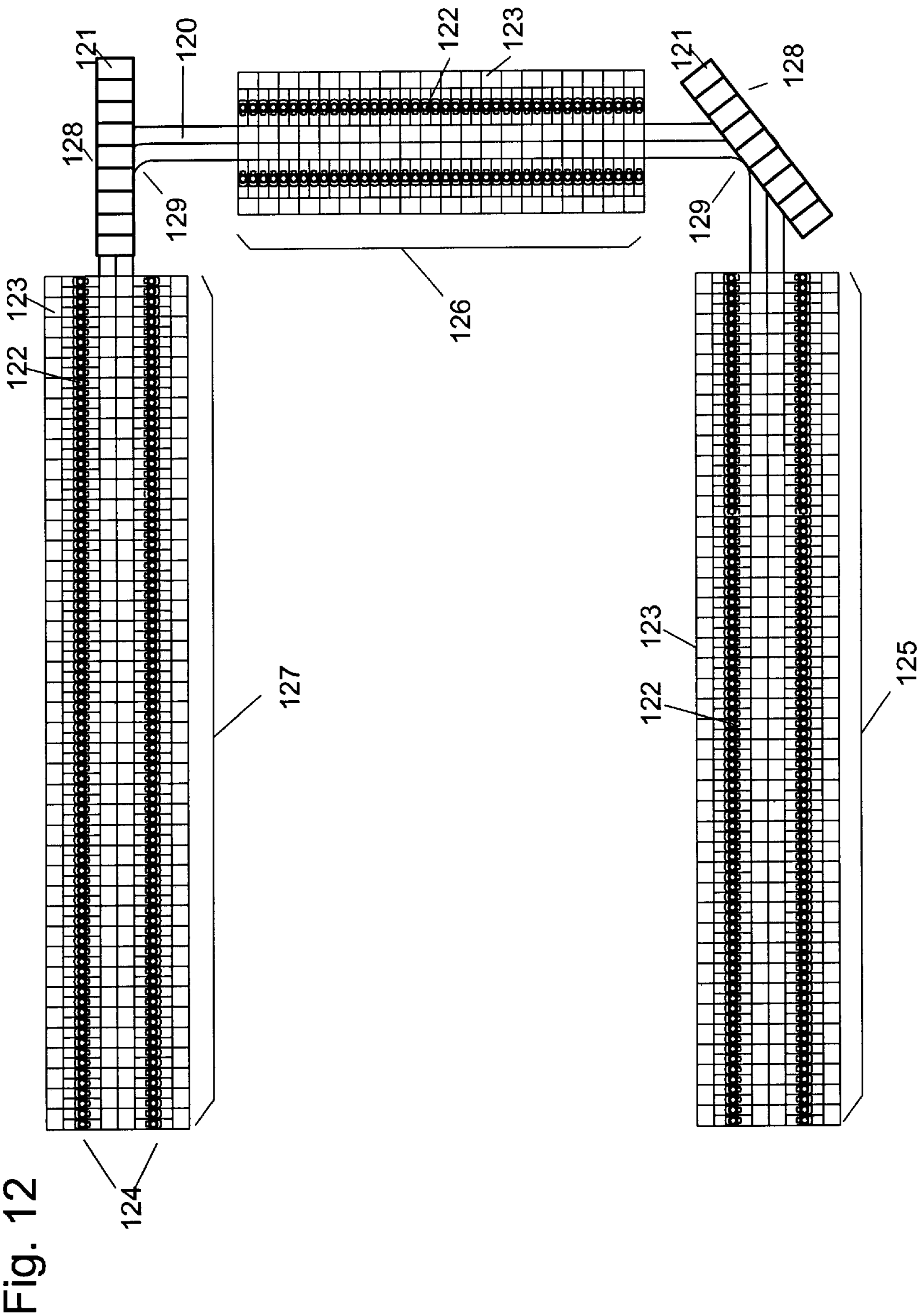
FIG. 12 shows a plan view of a hospital drug distribution system (HDDS) according to the invention.
Figure 14A:
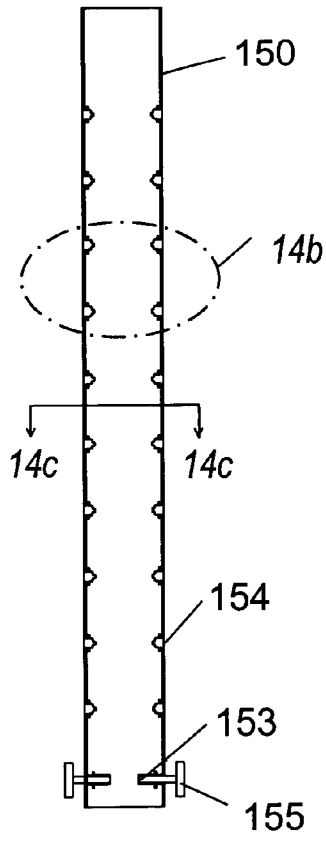
FIG. 14*a* shows a side sectional view of an elastic valve (EV) for a four-channel tube according to the invention.
Figure 14B:
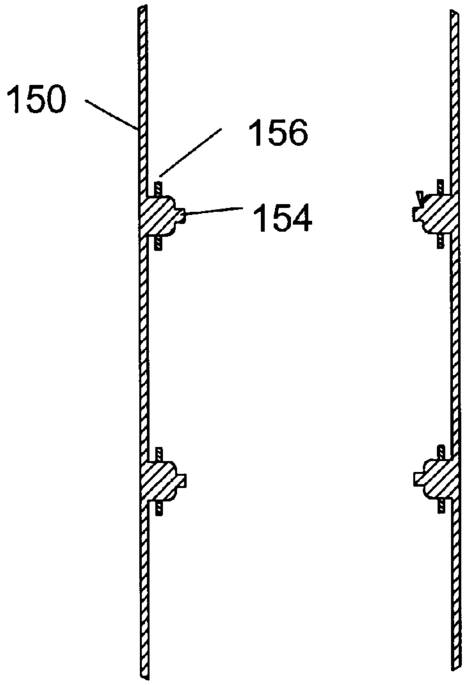
FIG. 14*b* shows a detail of the EV, within the oval "14*b*" from FIG. 14*a*.
Figure 14C:
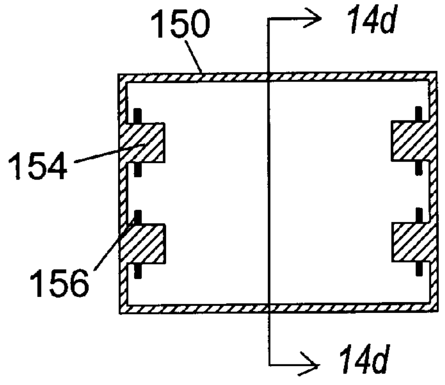
FIG. 14*c* shows a top sectional view of the EV, along the lines 14c—14c in FIG. 14*a*.
Figure 14D:
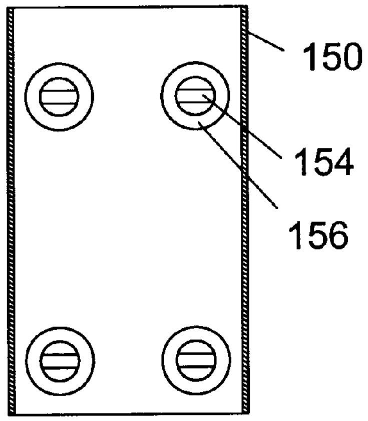
FIG. 14*d* shows a sectional view of the EV, along the lines 14*d*—14*d* in FIG. 14*c*.

Accordingly, to satisfy the above constraints in an efficient manner, the above-described apparatus is especially suited for use in an HDDS, as shown in plan view in FIG. 12, including a conveyor (120), which conveys multiple cups (121) in trays (128) single-file underneath the tubes (122) and valves (123). The tubes (122) and valves (123) are preferably arranged in banks (125)(126) and (127) in a "U" arrangement, to save space. The conveyor (120) bends around the "U", and the trays (128) can turn around the corners, where space has been left to allow them to swivel as they turn.

At each step of such conveyance, the cups (121) stop under the valves (123), and if any given cup is situated underneath a tube (122) containing drugs that are prescribed for the corresponding patient, the attached valve (123) dispenses the required number of medicinal units from the tube (123) into the cup (121).

Thus, each cup, in its journey, travels to and stops under every tube, but only a small subset of tubes ultimately discharge into any given cup. Because multiple cups are thusly conveyed simultaneously, however, at each stop zero, one or multiple tubes discharge into the cup that is situated beneath it. In this manner, by the time all the cups have completed the journey underneath the full set of drug tubes, hundreds of cups have been correctly filled with a single dosage of one or a few drugs, as needed by the corresponding patient. Thus many hundreds of patients' medicinal needs for that particular time of day are fulfilled simultaneously.

To double the number of drug tubes present in one HDDS installation the tubes are preferably arranged in two parallel rows (124). FIG. 11*b* shows a lateral cross sectional view of a pair of VUs (110) specially adapted to accommodate two such parallel rows of drug tubes. The two VUs are situated across from each other and share a common funnel (115). Each VU (110) accommodates a pair of tubes (116)(117), (118)(119) adjacent to one another. Each valve (111) has its own set of shutter solenoids (113) and catcher solenoids (114) for a total of four valves in the two VUs. All valves (111) in both VUs (110) release medicinal units (112) into the common funnel (115), which in turn empties into the cup (121) situated beneath it.

Figure 11A:
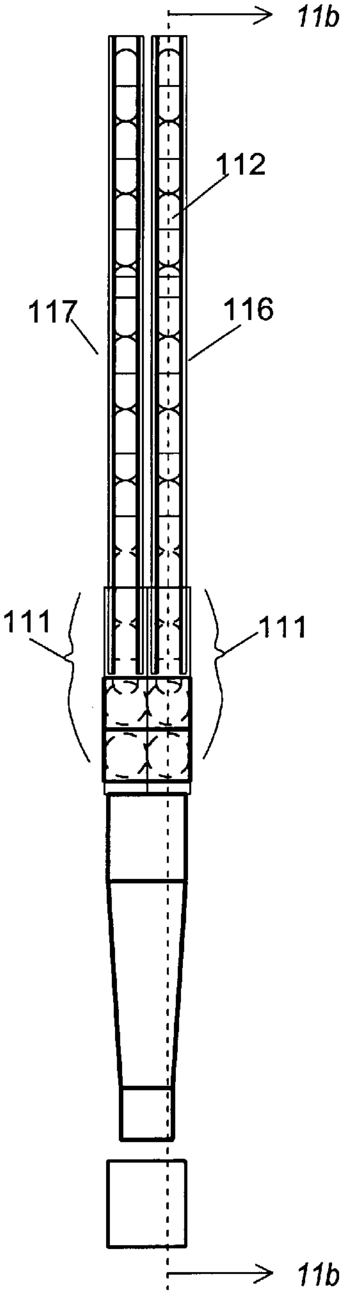
FIG. 11*a* shows a front view of a valve-unit (VU) according to the invention.
Figure 11B:
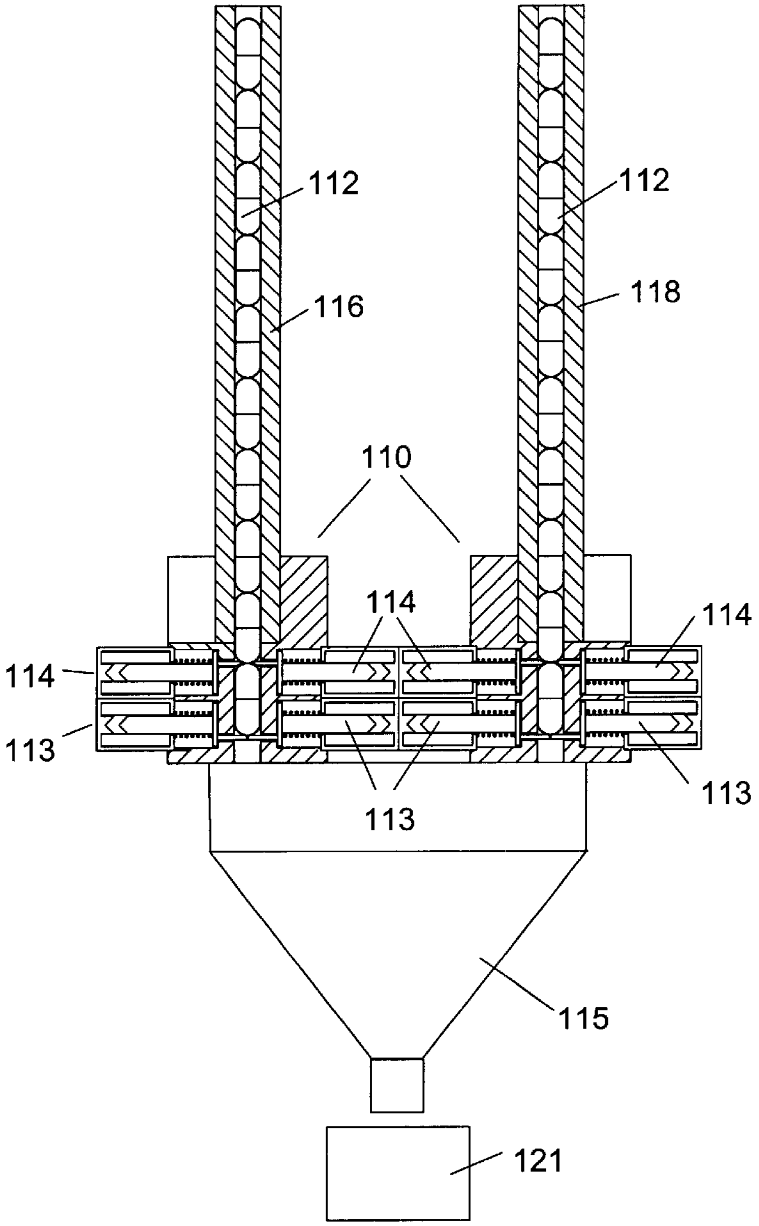
FIG. 11*b* shows a lateral cross-sectional view of a valve-unit (VU) according to the invention, along lines 11*b*—11*b* on FIG. 11*a*.

Referring to FIG. 11*a*, a front cross-sectional view of one of the VUs (110), a pair of valves (111) is situated side-by-side. Both valves in a given VU are for the same medication, but the medications in each VU may be different. Each VU accommodates a primary tube (116) and a backup tube (117) of the same drug. The currently active valve is the one whose tube is considered "primary" and the other is the backup. When active status is transferred to the other valve (when the first one runs out of medication or malfunctions), the tube coupled to it becomes primary, and the first tube needs replacement or clearing of the malfunction, at which point it becomes the backup.

Instead of VUs, the ITV embodiment may be used in a similar manner. Specifically, two ITVs disposed adjacent to one another dispense the same drug, with one ITV being the primary and the other being the backup at any given time. Each such pair of ITVs is situated across from another pair of ITVs that share the same dispensing funnel. Whether the VU or the ITV embodiment is used, the four valves share a common barcode reader to read the label on the medication cup that stops beneath the funnel in a "stop" phase of the conveyor belt's step-and-stop motion. The barcode reader forwards to each of the four valves' control electronics the drug code(s) on the medication cup, and each valve pair (whether a VU or a pair of ITVs) dispenses from its primary valve, if the drug code matches the code of the drug stored in the drug tubes.

4. Pharmacy (PDDS) Embodiment (i) Introduction

Pursuant to one embodiment of the invented device, the lower portion of the drug tube has small holes and is covered by an elastic rubber sleeve, mounted tightly upon the tube. A valve control mechanism engages the rubber sleeve to effect shutter and catcher doors and hence to cause the dispensing of a specific number of medicinal units from within the drug tube. This embodiment is especially well suited for use in a pharmacy situation, which differs from a hospital situation in at least three significant respects:

First, in a pharmacy each prescription is for a large number of units (pills or capsules), such as 30 or 60 units, of a single drug.

Second, because each prescription is for only one drug, in a pharmacy each container destined for a patient is filled with only one kind of drug, whereas a hospital patient may require a "cocktail" of multiple drugs at preset times of the day.

Third, because pharmacy customers arrive at the pharmacy at random times. Thus, a pharmacy attendant enters prescriptions into the system at varying times throughout the business day.

Therefore, although an HDDS is based upon underlying technology similar to that of a pharmacy DDS ("PDDS"), the overall design and operation of a PDDS is quite different from that of an HDDS. One difference is that, in the HDDS, the drug tubes and valves are stationary and the medication cups are brought to the tubes for filling. In the PDDS, a drug tube is brought to the container for filling of the container. Another difference is that in the PDDS a container assigned to a patient always contains only one drug, while in the HDDS, several drugs may be deposited into such a container, depending upon the patient's needs at that time.

The PDDS is built in modules whereby each module includes 250 to 500 different kinds of drugs. For each drug tube in the PDDS there is a backup tube in the system, in case the first tube runs out or malfunctions during the business day. Thus, the modules include 500 to 1,000 tubes each. A pharmacy chooses how many modules to include in its PDDS, and which infrequently used drugs are to be filled separately.

(ii) Packaging for the PDDS

The present embodiment, suitable for use in a PDDS, uses the same novel approach for drug packaging as in the embodiment described above more suited to an HDDS. In particular, the medicinal units are packaged in long tubes—approximately four to five feet long—in which the medicinal units are stacked one on top another in a single column. Because a pharmacy prescription is usually for many (e.g., 30 or 60) units, each tube has multiple channels to increase the total number of units each tube can hold.

Referring to FIG. 13*c*, a cross-sectional view of a tube for pills is illustrated. Such pill tube (130) has two channels (131), arranged side-by-side. Each such channel (131) is substantially rectangular in cross section, and is corrugated with inward-pointing wings (132) for ease of movement of the pills during dispensing, as discussed above. There is a hard plastic wall (133) between the channels (131). The tube is slightly deeper than it is wide, thus providing for strength against breakage due to the bulk of plastic (134) at front and back.

Referring to FIG. 13*d*, a cross-sectional view of a tube for capsules is illustrated. Such capsule tube (135) has four channels (136) arranged in a two-by-two matrix. Each such channel (136) is substantially circular in cross section, and is corrugated with inward-pointing wings (137) for ease of movement of the capsules during dispensing. There is a hard plastic wall (138) between the top and bottom rows of the matrix of channels. Preferably, however, there is no wall between the two channels in each row, as shown in FIG. 13*d*. This reduces the overall width of the drug tube. The depth of the tube is slightly greater than its width, thus providing for strength against breakage due to the bulk of plastic (139) at front and back.

The drugs are extracted from one channel of the tube at a time. When a channel runs out of units, the next channel is opened by the valve control (described below). The tube with the longest capsule, 0.85 inches, holds up to 280 capsules in four channels. Because there is a backup tube, the total number of capsules in both tubes (eight channels total) is 560. For a pill 0.5 inches in diameter, the number of pills per tube is 240 in two channels, and the total in two tubes (four channels total) is 480. Additional backup tubes are used in instances where more of the same drug is needed per re-stock cycle.

(iii) The Elastic Valve (EV) and Closure Confirmation System (CCS)

In a system which moves the tubes and valves, it is advantageous for each tube plus its valve to be compact and light weight for easy movement. To achieve these two properties (compactness and lightness), the invented device includes a novel valve to control the extraction of medicinal units from within the tube. The valve has two parts. The first is the Elastic Valve, or EV; the second is the Closure Confirmation System, or CCS. When the EV and the CCS are mounted on a valve tube, it will be called an "integrated elastic valve" or "IEV".

Referring to FIGS. 14*a*–14*d*, the EV is a molded rubber sleeve (150), intended to be mounted tightly on the lower part of the drug tube. The drug tube is modified to have apertures accommodating a shutter (153) of the sleeve (150) at the bottom, and multiple catchers (154) of the sleeve (150) above the shutter (153) at intervals equal to the height of one medicinal unit. The sleeve (150) is fabricated to include catchers (154) that push through these apertures when it is mounted upon the tube.

Although they do protrude to some degree through the apertures, these catchers are by default in the open position, such that they do not block the fall of medicinal units through the interior of the tube. Also included in the sleeve is a set of shutters (153) that push through the bottom apertures of the plastic tube. These shutters are by default in the closed position, as they are pushed in by the force of the rubber. Each shutter also has a handle (155) for a pull solenoid to pull to open the door.

Figure 18A:
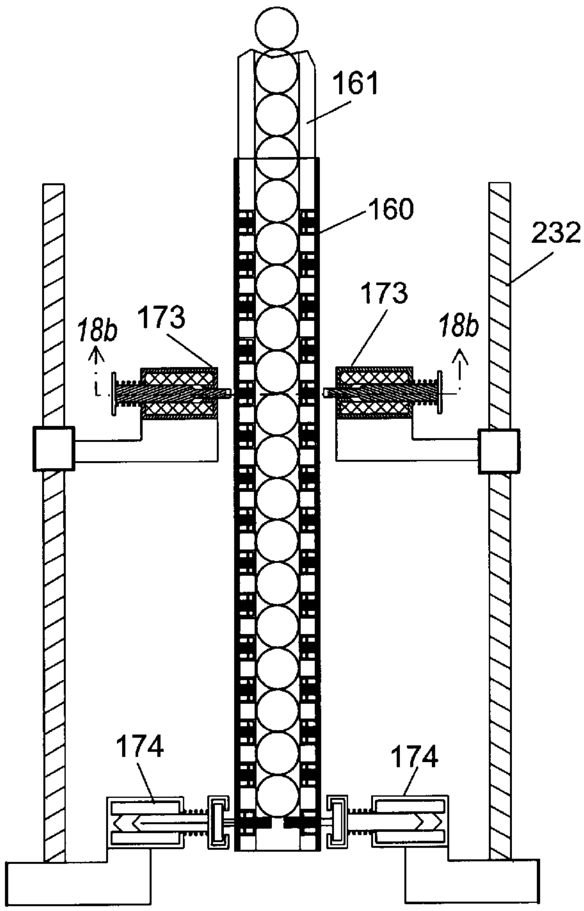
FIG. 18*a* shows a side sectional view of a two-channel integrated elastic valve (IEV) according to the invention.

As previously noted, to accommodate the EV, the lower part of the drug tube, i.e., the part that is covered by the EV, is modified. There are apertures—holes or slits—in the drug tube wall at the bottom of the drug tube for the shutter door. These holes allow a shutter door to press inward and thus prevent the medicinal units from falling out of the tube. The shutter door is part of the IEV, and, as shown in FIG. 18*a*, is closed, i.e., pushed in through the corresponding aperture, by the force of the elastic rubber material that makes up the EV, to prevent the medicinal units from spilling out of the tube. The door is thus closed when not activated. When activated at the extraction station, the door is opened by pulling on the door handle.

Above the shutter holes, there are many—preferably 15—catcher holes are located along the bottom portion of the tube, above the shutter holes. These catcher holes are adapted to accommodate catcher doors, which are part of the EV. Unlike the shutter door, however, the catcher doors are not in the closed state when they are not activated. At the extraction station, during the extraction cycle, the doors are closed as appropriate by pushing on them from the outside.

Assuming 15 catchers per tube, the catcher holes are located at each point where two of the bottom 16 medicinal units in the tube touch each other. These apertures are located directly adjacent to the catcher doors, so that any given catcher door can be closed by the control electronics by pushing the catcher in through the corresponding aperture in the drug tube. The size of the apertures varies from approximately 0.30 inches in diameter for long capsules to approximately 0.15 inches in diameter for small pills.

Unlike the catchers, the shutter of a given column of medicinal units within a drug tube is closed at all times except during drug extraction, so that the units do not spill out uncontrolled. Accordingly, the shutter door (153) is part of the IEV, and, as shown in FIGS. 16*a–e* and 18*a–e*, is pushed in through the corresponding aperture by the force of the elastic rubber material that makes up the EV (150, 160).

Figure 16A:
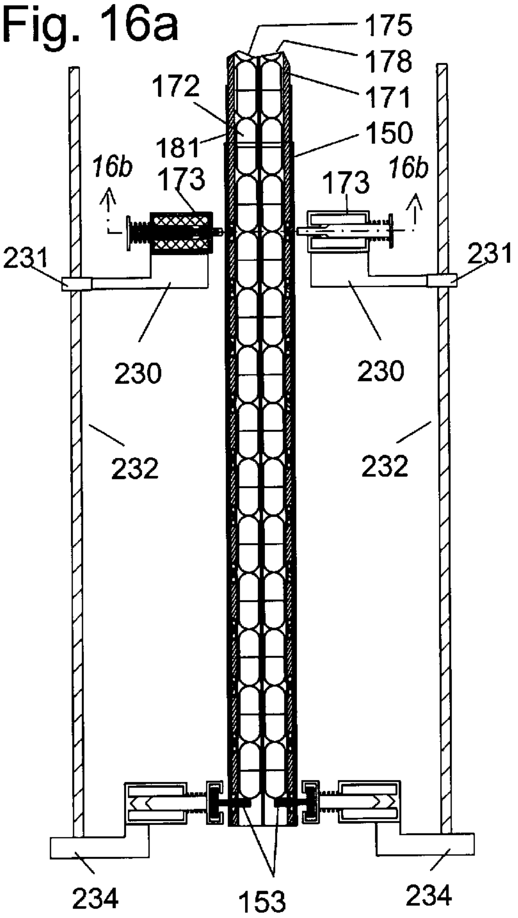
FIG. 16*a* shows a side sectional view of a four-channel integrated elastic valve (IEV) according to the invention.
Figure 16C:
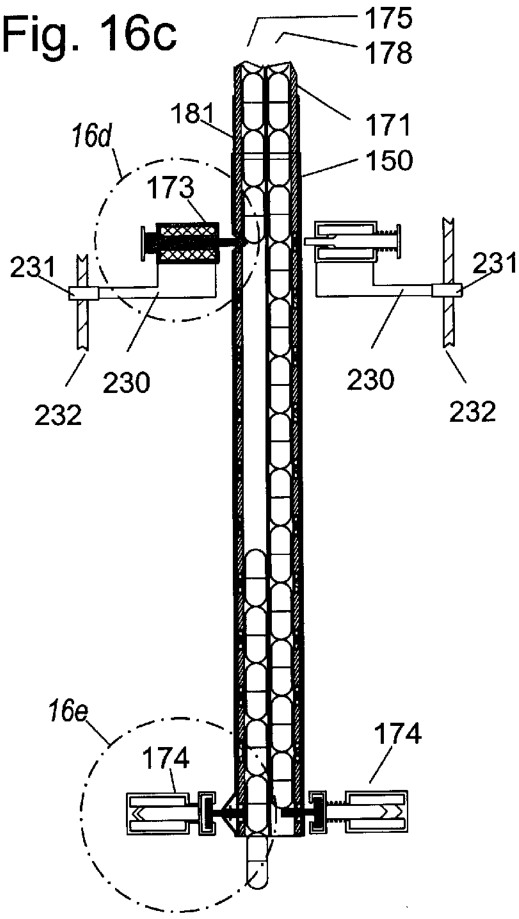
FIG. 16*c* shows a side sectional view of a four-channel integrated elastic valve (IEV) according to the invention, dispensing a number of capsules.
Figure 16B:
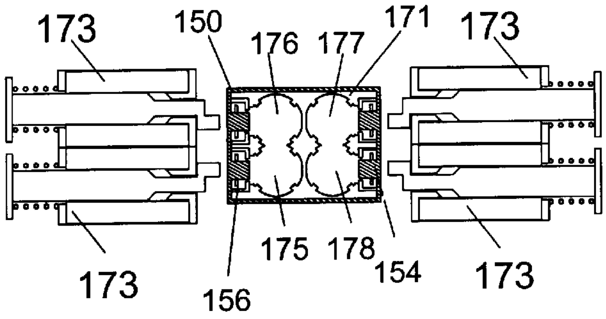
FIG. 16*b* shows a sectional view of an IEV, along the lines 16*b*—16*b* in FIG. 16*a*.
Figure 16D:
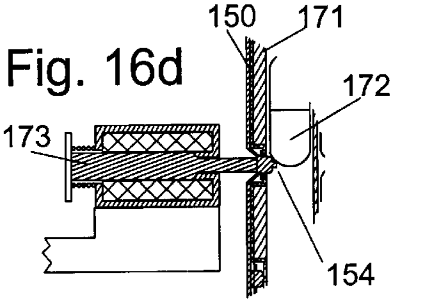
FIG. 16*d* shows a detail of a catcher solenoid and catcher door, from circle "16*d*" in FIG. 16*c*.
Figure 16E:
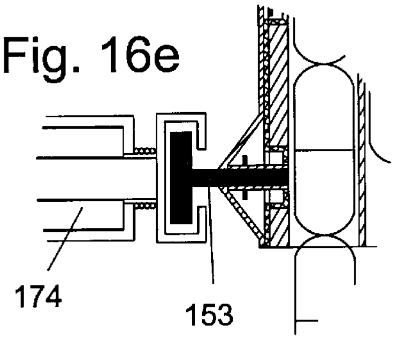
FIG. 16*e* shows a detail of a shutter solenoid and shutter, from circle "16*e*" in FIG. 16*c*.
Figure 17A:
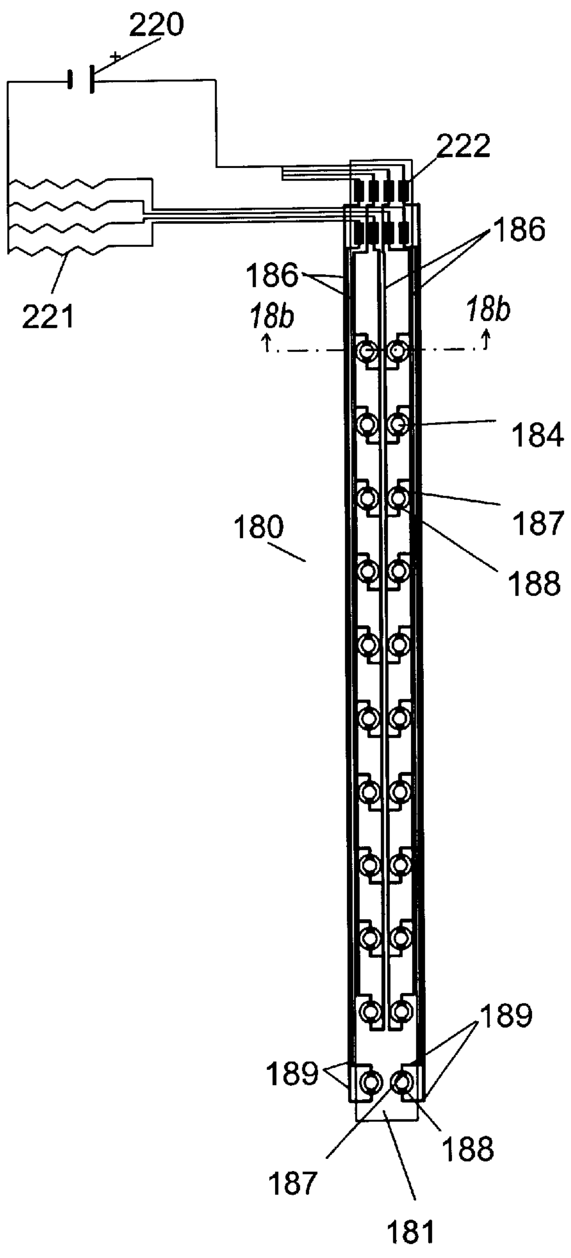
FIG. 17*a* shows a closure confirmation system (CCS) of a pharmacy drug distribution system (PDDS) valve according to the invention.
Figure 17B:
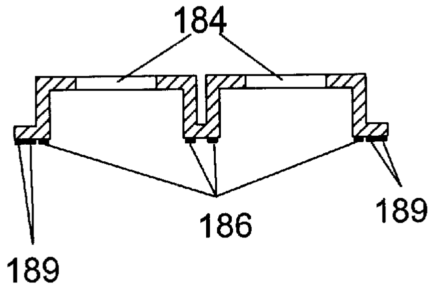
FIG. 17*b* shows a sectional view of the CCS, along lines 17*b*—17*b* in FIG. 17*a*.
Figure 17C:
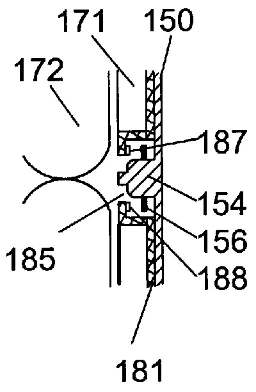
FIG. 17*c* shows a close-up sectional detail of a catcher door with the CCS.
Figure 17D:
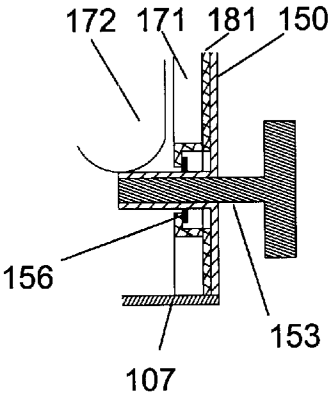
FIG. 17*d* shows a close-up sectional detail of a shutter with the CCS.

Referring to FIG. 16*e*, the extraction device includes a shutter door pull solenoid (174), which, when actuated by an electrical current, pulls the shutter (153) out against the force of the elastic rubber material, thus opening the shutter for release of the medicinal units. The pull solenoid (174) operates on a receiving member into which the handle of the shutter door is inserted during drug extraction. When the solenoid is actuated, the receiving member pulls the shutter door's handle away from the tube, thus opening the door. When the solenoid is no longer actuated by a current, the force of the rubber elastic material causes the shutter door to re-close.

When a shutter door is opened, and its handle is pulled away from the tube, it stretches the rubber of the EV. Ordinarily, the resulting deformation of the rubber sleeve at that point could affecting another shutter door at the same level as the one being opened. To prevent this, there is a separation slit in the rubber between two adjacent shutter doors. This way, when one is opened, it cannot affect the rubber on the other side of the separation slit, and hence, cannot have any affect on the other shutter door.

This manner of operation is distinct from that of the catcher doors (154), which are always open except when the catcher solenoid (173) of the extraction device pushes one of them in, thus preventing all medicinal units (172) above the closed (pushed-in) catcher door (154) from falling downward.

The length of the EV (150, 160) depends upon the size of the units in the drug tube. It is preferably equal to the height of fifteen medicinal units inside the tube. It thus varies from approximately four inches for small pills to approximately thirteen inches for long capsules. In addition, the inner structure of the IEV drug tube depends upon the size and kind of drug that is stored within the tube. FIGS. 14*a*–14*d* show a cross-sectional view of an EV sleeve for long capsules (approximately 0.83 inches long) is shown.

Figure 15A:
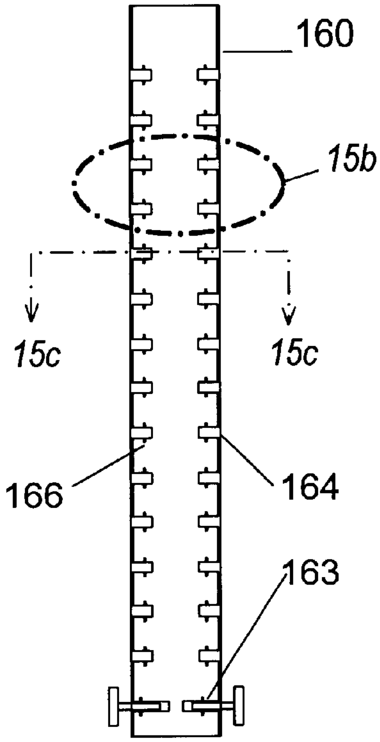
FIG. 15*a* shows a side sectional view of an elastic valve (EV) for a two-channel tube according to the invention.
Figure 15B:
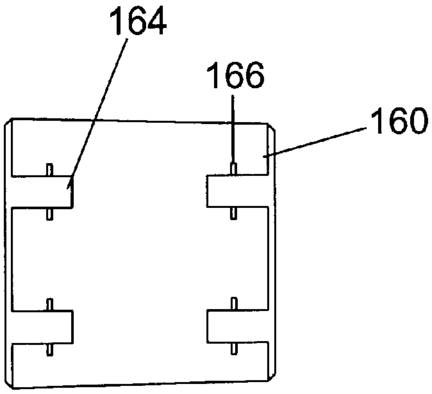
FIG. 15*b* shows a detail of the EV, within the oval "15*b*" from FIG. 15*a*.
Figure 15C:
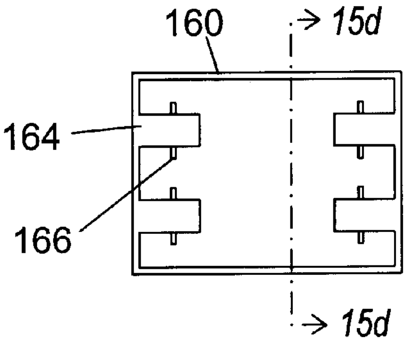
FIG. 15*c* shows a top sectional view of the EV, along the lines 15*c*—15*c* in FIG. 15*a*.
Figure 15D:
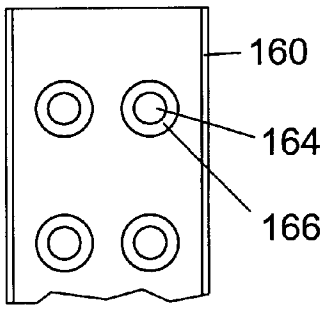
FIG. 15*d* shows a sectional view of the EV, along the lines 15*d*—15*d* in FIG. 15*c*.

FIG. 15*a* shows a cross-sectional view of an EV sleeve (160) for pills (approximately 0.5 inches in diameter). The EV, which fits as a sleeve (160), around the tube (161), has one shutter (163) at the bottom, with multiple catchers (164). As will be seen below, the level at which the catcher (164) is actuated depends upon how many medicinal units must be dispensed from the tube to fill the current prescription.

FIGS. 16*a*–16*e* show an EV (150) mounted on a tube (171) storing capsules (172). The extraction station's upper solenoids (173) activate the catcher, and its lower solenoids (174) activate the shutter. For a four-channel tube two solenoids are required for each channel. Referring to FIGS. 18*a*–18*e*, for a two-channel tube storing pills, four solenoids are required per channel. Thus, in each case, eight solenoids are required per tube.

Referring again to FIGS. 14*a*–14*d* and 15*a*–15*d*, the EV has multiple catcher doors (154, 164), any one of which can be used for a particular extraction of medicinal units. This makes extraction of such units more efficient than if the units always had to be extracted one at a time, as multiple units can be dispensed with each shutter/catcher extraction cycle.

To achieve this efficiency, the upper (catcher) solenoids are mounted on a computer-controlled device, referred to herein as a "catcher-elevator" (223). The catcher-elevator is preferably a rotating screw, so the height of the catcher solenoid is changed according to the location of the catcher door to be opened, which in turn depends upon the medication size and the number of units to be extracted. Alternatively, the catcher-elevator can be constructed from belts, cables, chains, or the like, that move the catcher up and down by means of a system of pulleys.

Figure 18C:
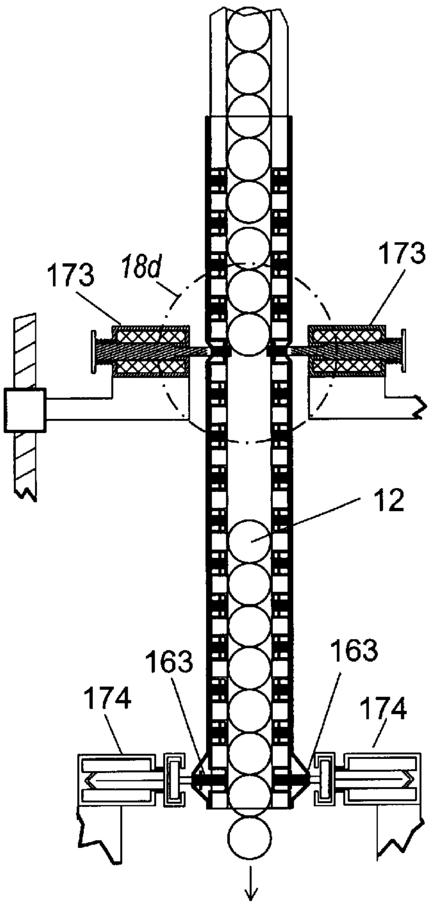
FIG. 18*c* shows a side sectional view of a two-channel integrated elastic valve (IEV) according to the invention, dispensing a number of pills.
Figure 18B:
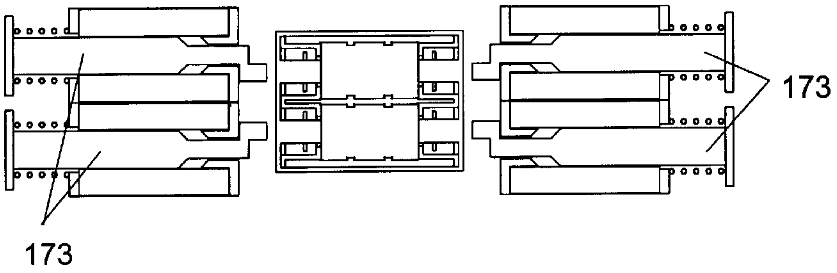
FIG. 18*b* shows a sectional view of an IEV, along the lines 18*b*—18*b* in FIG. 18*a*.
Figure 18D:
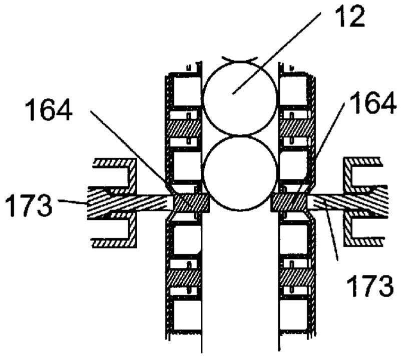
FIG. 18*d* shows a detail of a catcher solenoid and catcher door, from circle "18*d*" in FIG. 18*c*.

FIGS. 16*c* and 18*c* illustrate extraction of capsules and pills, respectively, from an IEV. If the total number of units to be extracted, n, is 15 or fewer, the catcher-elevator (223) moves the catcher to a height such that, when the catcher solenoids (173) are activated (and thus the catcher is closed) and the shutter solenoids (174) are activated (and thus the shutter is opened), exactly n medicinal units fall out of the tube. In this scenario, one extraction cycle is sufficient to extract all the units needed to fill the prescription. Before extraction, the shutter is closed and all catchers are open (no solenoids are activated). One extraction cycle includes five steps.

First, the catcher solenoids are moved to the correct level for extracting the right number of medicinal units in the present cycle (see below).

Second, the catcher door is closed by applying current to the catcher push solenoid.

Third, the shutter door is opened by applying current to the shutter pull solenoid, thus allowing a free-fall of several medicinal units.

Fourth, the shutter door is closed by stopping the current to the shutter pull solenoid.

Fifth the catcher door is opened by stopping the current to the catcher push solenoid, thus allowing a free-fall of the remaining medicinal units inside the tube, such that they rest on the closed shutter door.

If n, the total number of units to be extracted, is 15 or less, the catcher-elevator moves the catcher solenoid to the nth catcher door up from the shutter door, and only one extraction cycle is needed. If n is greater than 15, however, the control computer determines n's highest divisor, i, that is 15 or less, and signals the catcher elevator to set the catcher solenoids to a height such that, when the catcher is closed and the shutter is opened, i units fall out of the tube. Thus, i units are extracted per extraction cycle. The computer causes n/i extraction cycles to occur, after which the total needed units will have fallen out of the tube into the container. For example, if the prescription calls for 35 pills, then n=35 and i=7. Five extraction cycles occur with the catcher solenoids situated during extraction to activate (open and close) the seventh catcher door up from the shutter. In this way, five groups of seven pills fall out of the tube.

The above notwithstanding, it is preferable that, if i is less than 5, the catcher height is set to 15 instead of i, and then several extraction cycles take place at height 15. After that, the catcher height is set to m=(n modulo 15), and one extraction cycle takes place at height m. For example, if n=38, then i=2. In that event, rather than activate the second catcher door 19 times, the IEV activates the top (fifteenth up from the shutter) catcher door twice, then moves the catcher solenoids to the eighth catcher door up from the shutter, and activates it once. This tends to minimize the overall number of times the solenoids are activated and the amount of movement of the catcher solenoids from one level to another, thus saving wear and tear on both the solenoids and the catcher-elevator.

At first it might appear that this is disadvantageous because the time it takes the catcher-elevator to move the catcher from height 15 to height m becomes the time bottleneck of the extraction process. In a pharmacy setting, however, where prescriptions are filled individually at random times of the day, a small increase in extraction time is not as critical as in a hospital setting, where the medication cups must be marched underneath hundreds or thousands of drug tubes during a run of the HDDS.

Indeed, a greater concern for the pharmacy is frequency of solenoid replacement. Each solenoid in the extraction station is actuated a finite number of times before needing replacement. Hence it is important to minimize the number of times the shutter and catcher solenoids are actuated during the filling of each prescription. It is also important to minimize the activity of the catcher-elevator, to reduce replacement frequency of its parts (otherwise, whenever n >15, the PDDS would simply set the catcher height to 15, complete n/15 extraction cycles, and then set the height to m=n modulo 15 and complete one extraction cycle.) The control computer will determine in each case where the solenoid should be located to best minimize the movement of the catcher solenoid and minimize the number of actuations.

The CCS of the IEV confirms closure of the catcher and shutter. As with the above-described HDDS valve, such confirmation facilitates the system to prevent the shutter from being opened before the catcher is closed, and vice-versa. Referring to FIGS. 17*a*–17*d*, the main component of the CCS (180) comprises a thin, molded "wall" of plastic (181) disposed between the EV elastic rubber sleeve (150) and the tube (171) upon which the sleeve is mounted. Thus, there are a total of three layers of material: innermost is the wall of the drug tube (171), then the CCS plastic layer (181), then the EV (150) mounted as a sleeve upon both of those.

The CCS plastic wall has two columns of depression rings (184) which fit into the apertures (185) in the tube wall. Printed, electrically conducting strips (186) connect in parallel contacts (187) on the upper side of the depression rings (184) and contacts (188) on the lower side of the depression rings (184) of all catchers in each column. The lowest hole in each column is the shutter opening; it has a separate pair of conducting strips (189). Preferably, the positive leads (+) are connected directly to the positive terminal of the power supply. Each of the negative leads (–) is connected to the negative terminal of a power supply (220) via a resistor (221) of, preferably, 1000-Ohms. The resistor (221) is used as a sensor: a zero voltage across it indicates that the door is open, while a high (5-volt) voltage indicates that the door is closed.

When the shutter or one of the catchers is closed, a metal ring (156) on the door presses against the depression ring (184) and electrically shorts the upper contact (187) to the lower contact (188), which in turn closes the current loop, thus causing a five-volt signal to be measured across the resistor, indicating that the door is closed. When the door is subsequently opened, the current loop is broken and no voltage is measured across the resistor, thus indicating that the door is open.

Accordingly, referring again to FIG. 14*c*, the second part of the CCS consists of metal rings (156) fitted upon the catchers (154) and shutters (153). These rings are placed upon the elastic rubber of the EV, rather than the plastic wall. When a shutter or catcher door is closed, the fitted ring closes the electrical circuit by short-circuiting the upper contact to the lower contact in the corresponding depression of the thin plastic wall of the CCS, as described above, thus indicating that either the catcher or the shutter is closed, as the case may be.

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. A device for storing and dispensing solid medicinal units comprising:

a) a drug tube having a cavity for storing medicinal units in a vertical column, having at least three wings running a length of the cavity and protruding internally from an interior wall of the cavity such that each medicinal unit stored therein touches the interior wall thereof only at the wings; and b) a dispensing valve disposed at a bottom portion of the drug tube for dispensing one medicinal unit per cycle, comprising:

i) a catcher comprising a pair of half-doors, movable between a closed position blocking the cavity and an open position;

ii) a shutter comprising a pair of half-doors, movable between a closed position blocking the cavity and an open position, located below the catcher and defining a chamber therebetween, the chamber being of a size to hold one medicinal unit;

iii) a catcher solenoid coupled to each half-door of the catcher for movement of the catcher between the closed position and the open position;

iv) a shutter solenoid coupled to each half-door of the shutter for movement of the shutter between the closed position and the open position;

such that when the catcher is in the closed position and the shutter solenoid moves the shutter to the open position, one medicinal unit is dispensed from the chamber, and when the shutter is in the closed position and the catcher solenoid moves the catcher to the open position, the chamber is loaded with one medicinal unit.

2. The device of claim 1 wherein the drug tube is permanently attached to the dispensing valve.

3. The device of claim 1 wherein the drug tube is removable from the dispensing valve.

4. The device of claim 3 wherein each drug tube and dispensing valve have mating indexing forms such that a drug tube can be operatively connected to a dispensing valve only when dimensions of a medicinal unit dispensable by the chamber are the same as the dimensions of medicinal units storable in the tube.

5. The device of claim 4, in which the indexing forms are opposing protrusions and indentations.

6. The device of claim 1, in which the catcher further comprises a closure confirmation system comprising a plurality of electrical contacts located adjacent to the catcher, the catcher being at least partially electrically conductive, such that the catcher completes a circuit between the electrical contacts when the catcher is in the closed position.

7. The device of claim 1, in which the shutter further comprises a closure confirmation system comprising a plurality of electrical contacts located adjacent to the shutter, the shutter being at least partially electrically conductive, such that the shutter completes a circuit between the electrical contacts when the shutter is in the closed position.

8. The device of claim 1, in which:

a) the catcher solenoid comprises a solenoid spring which biases the catcher toward the closed position; and b) the catcher comprises a door having a door spring biasing the door toward the cavity;

the door spring being a weak spring relative to the solenoid spring.

9. A device for storing and dispensing solid medicinal units comprising:

a) a drug tube having at least one cavity for storing medicinal units in one vertical column; each cavity having a shutter aperture disposed at a bottom portion thereof and a plurality of catcher apertures disposed above the shutter aperture, the shutter aperture and plurality of catcher apertures being spaced apart a distance substantially equal to a height of one medicinal unit to be stored within the cavity;

b) an elastic rubber sleeve mounted upon at least a lower part of the drug tube, comprising, for each internal cavity within the drug tube, one shutter door slidably inserted into the shutter aperture of the internal cavity and protruding into the cavity such that it prevents the medicinal units stored therein from falling; and, for each catcher aperture, one catcher door disposed in an open position when no force is exerted upon it;

c) for each cavity in the drug tube, a catcher solenoid which, when actuated, pushes a catcher door into the cavity through a catcher aperture, preventing any downward movement of medicinal units above the catcher aperture;

d) for each cavity in the drug tube, a shutter door pull solenoid which, when actuated, pulls a shutter door of a drug tube situated in the extraction station out through a shutter aperture in which the shutter door is slidably inserted, thus allowing downward movement of at least one medicinal unit above the shutter aperture;

such that when a catcher solenoid is activated and the shutter solenoid is activated, medicinal units below the catcher door operated by the catcher are dispensed.

10. The device of claim 9, in which the drug tube further comprises at least three wings running a length of each cavity and protruding internally from an interior wall of the cavity such that each medicinal unit stored therein touches the interior wall thereof only at the wings.

11. The device of claim 9, further comprising an elevator for moving the catcher solenoid to a selected catcher door.

12. The device of claim 11, in which the elevator comprises a vertical screw, parallel to the drug tube, and the catcher solenoid is mounted upon a threaded collar surrounding the screw, such that rotation of the screw causes the catcher solenoid to be moved vertically along the drug tube from one catcher door to another.

13. The apparatus of claim 9 wherein the drug tube further comprises a closure confirmation system for confirming closure of the catcher and shutter doors, comprising:

a thin wall, disposed between the rubber sleeve and the drug tube upon which the sleeve is mounted, adapted to fit over the drug tube and having one or more shutter depression rings, one fitting into each shutter aperture, and one or more catcher depression rings, each fitting into one catcher aperture, wherein all depression rings have an upper side and a lower side;

a plurality of contacts, one on each depression ring's upper side and one on each depression ring's lower side;

an electrically conducting strip connecting in parallel all contacts on the lower side of all catcher depression rings;

an electrically conducting strip connecting in parallel all contacts on the upper side of all catcher depression rings;

a pair of shutter conducting strings, one connected to the contact on the upper side of a shutter depression ring and the other connected to the contact on the lower side of the same shutter depression ring; and a plurality of metal rings, one on each shutter door and each catcher door;

such that, when the shutter door or one of the catcher doors is closed, the metal ring on that door presses against the depression ring and electrically shorts the upper contact to the lower contact, which closes a current loop causing a signal confirming that the door is closed.

* * * * *